(12) United States Patent
Nique et al.

(10) Patent No.: US 11,085,523 B2
(45) Date of Patent: Aug. 10, 2021

(54) PLANETARY GEARING

(71) Applicants: Rolls-Royce Deutschland Ltd & Co KG, Blankenfelde-Mahlow (DE); Rolls-Royce plc, London (GB)

(72) Inventors: Michael Nique, Berlin (DE); Paul Gorenz, Berlin (DE); Christopher Campbell, Berlin (DE); Frank Wagner, Bruchsal (DE); Mark Spruce, Bristol (GB); Daren Ashmore, Nottingham (GB)

(73) Assignees: Rolls-Royce Deutschland Ltd & Co KG, Blankenfelde-Mahlow (DE); Rolls-Royce plc, London (GB)

( * ) Notice: Subject to any disclaimer, the term of this patent is extended or adjusted under 35 U.S.C. 154(b) by 176 days.

(21) Appl. No.: 16/198,172

(22) Filed: Nov. 21, 2018

(65) Prior Publication Data

US 2019/0162292 A1  May 30, 2019

(30) Foreign Application Priority Data

Nov. 24, 2017 (DE) .................... 10 2017 127 874.5
Nov. 24, 2017 (DE) .................... 10 2017 127 876.1

(51) Int. Cl.
*F16H 57/08* (2006.01)
*F02C 7/36* (2006.01)
(Continued)

(52) U.S. Cl.
CPC ............ *F16H 57/08* (2013.01); *F01D 25/18* (2013.01); *F02C 7/36* (2013.01); *F16C 23/04* (2013.01);
(Continued)

(58) Field of Classification Search
CPC ........ F16H 1/2836; F16H 57/08; F16C 23/04; F16C 2240/50; F16C 7/36;
(Continued)

(56) References Cited

U.S. PATENT DOCUMENTS 1,425,430 A * 8/1922 Wikander ............. F16H 1/2836
475/335
2,127,463 A 8/1938 Roland et al.
(Continued)

FOREIGN PATENT DOCUMENTS

CN 201396406 Y 2/2010
CN 202082374 U 12/2011
(Continued)

OTHER PUBLICATIONS

European Search Report dated Mar. 15, 2019 for counterpart European Patent Application No. 18206982.3.
(Continued)

*Primary Examiner* — Sherry L Estremsky
(74) *Attorney, Agent, or Firm* — Shuttleworth & Ingersoll, PLC; Timothy Klima

(57) ABSTRACT

A planetary gearing includes a sun gear rotating about a rotation axis and driven by a sun shaft; planet gears driven by the sun gear, each planet gear having an axially forward face side and an axially rearward face side; a ring gear engaging the planet gears; and planet slide bearing pins, wherein respectively one planet slide bearing pin is arranged inside a planet gear forming a lubricated journal bearing. At an axially forward face side and/or axially rearward face side, each planet gear forms a recess that extends inside the planet gear starting from the face side, and the planet slide bearing pins respectively form one crowning at their abutment surface such that their outer diameter decreases from
(Continued)

a maximum outer diameter to at least an axial end of the abutment surface and has a minimum at the axial end.

16 Claims, 16 Drawing Sheets

(51) Int. Cl.
    *F16H 57/04*     (2010.01)
    *F16H 1/28*     (2006.01)
    *F16C 23/04*     (2006.01)
    *F01D 25/18*     (2006.01)

(52) U.S. Cl.
    CPC ............. *F16H 1/28* (2013.01); *F16H 1/2836* (2013.01); *F16H 57/0479* (2013.01); *F16H 57/0486* (2013.01); *F16H 57/082* (2013.01); *F05D 2260/40311* (2013.01); *F05D 2260/98* (2013.01); *F16C 2240/50* (2013.01); *F16H 2057/085* (2013.01)

(58) Field of Classification Search
    CPC ............. F05D 2260/40311; F02C 7/36; F02D 2260/40311
    See application file for complete search history.

(56) References Cited

U.S. PATENT DOCUMENTS

| | | | | |
|---|---|---|---|---|
| 2,498,295 | A * | 2/1950 | Peterson | F16H 1/2836 |
| | | | | 475/347 |
| 2,547,877 | A | 4/1951 | Lucia et al. | |
| 2,749,778 | A | 6/1956 | Otto et al. | |
| 2,932,992 | A * | 4/1960 | Larsh | F16H 1/46 |
| | | | | 475/176 |
| 2,936,655 | A | 5/1960 | Peterson et al. | |
| 3,257,869 | A * | 6/1966 | Sharples | F16H 1/2836 |
| | | | | 475/347 |
| 3,355,789 | A * | 12/1967 | Tetsull | F16H 1/20 |
| | | | | 29/893.1 |
| 3,363,413 | A * | 1/1968 | Jones | F02C 3/103 |
| | | | | 60/791 |
| 3,425,301 | A * | 2/1969 | Shannon | F16H 57/04 |
| | | | | 475/159 |
| 4,104,932 | A | 8/1978 | Hansson | |
| 4,271,928 | A | 6/1981 | Northern | |
| 4,384,498 | A | 5/1983 | Eichinger | |
| 5,098,358 | A * | 3/1992 | Igaku | F16H 57/02004 |
| | | | | 475/335 |
| 5,518,319 | A | 5/1996 | Selby | |
| 6,964,155 | B2 * | 11/2005 | McCune | F02C 7/36 |
| | | | | 384/297 |
| 8,075,190 | B1 | 12/2011 | Wadehn et al. | |
| 8,205,432 | B2 * | 6/2012 | Sheridan | F02C 7/36 |
| | | | | 60/226.3 |
| 8,262,535 | B2 * | 9/2012 | Klingels | F16H 57/082 |
| | | | | 475/347 |
| 8,313,412 | B2 | 11/2012 | Montestruck | |
| 8,333,678 | B2 * | 12/2012 | McCune | F01D 25/162 |
| | | | | 475/331 |
| 8,790,213 | B1 * | 7/2014 | Isayama | F03D 15/00 |
| | | | | 475/346 |
| 8,899,916 | B2 * | 12/2014 | McCune | F16H 1/2836 |
| | | | | 415/124.1 |
| 10,047,792 | B2 | 8/2018 | Guettler | |
| 2003/0236148 | A1 | 12/2003 | Fox | |
| 2004/0192491 | A1 | 9/2004 | Becquerelle et al. | |
| 2004/0259679 | A1 | 12/2004 | Becquerelle et al. | |
| 2005/0075211 | A1 | 4/2005 | Fox et al. | |
| 2009/0111639 | A1 | 4/2009 | Klingels | |
| 2010/0197445 | A1 | 8/2010 | Montestruc | |
| 2015/0300255 | A1 | 10/2015 | Gallet et al. | |
| 2015/0323056 | A1 | 11/2015 | Sheridan | |
| 2016/0097331 | A1 * | 4/2016 | Venter | F16C 27/045 |
| | | | | 415/122.1 |
| 2016/0201793 | A1 | 7/2016 | Muldoon | |
| 2016/0341248 | A1 * | 11/2016 | Guettler | F16C 17/02 |
| 2017/0261095 | A1 | 9/2017 | Littlefield et al. | |
| 2019/0162292 | A1 | 5/2019 | Nique et al. | |
| 2019/0162293 | A1 | 5/2019 | Nique et al. | |
| 2020/0011411 | A1 * | 1/2020 | Gilliland | F16H 57/08 |

FOREIGN PATENT DOCUMENTS

| | | | | |
|---|---|---|---|---|
| DE | 66534 | A1 | 4/1969 | |
| DE | 2235448 | A1 * | 2/1974 | ............... F16H 1/48 |
| DE | 2648154 | A1 | 5/1977 | |
| DE | 2925964 | A1 | 1/1980 | |
| DE | 2843459 | A1 | 4/1980 | |
| DE | 289318 | A5 | 4/1991 | |
| DE | 10318945 | B3 | 10/2004 | |
| DE | 602004001476 | T2 | 2/2007 | |
| DE | 102005054088 | A1 | 5/2007 | |
| DE | 102007031726 | A1 | 1/2009 | |
| DE | 102013221265 | A1 | 5/2015 | |
| DE | 102015221633 | A1 | 5/2017 | |
| DE | 102016124738 | A1 | 6/2018 | |
| EP | 0188616 | A1 | 7/1986 | |
| EP | 1028275 | A2 | 8/2000 | |
| EP | 1649191 | A1 | 4/2006 | |
| EP | 2518296 | A2 | 10/2012 | |
| SU | 533779 | A1 | 10/1976 | |
| WO | 2013106879 | A1 | 7/2013 | |

OTHER PUBLICATIONS

European Search Report dated Mar. 14, 2019 for related European Patent Application No. 18207036.7.
European Search Report dated Apr. 10, 2019 for related Euroepan Patent Application No. 18206995.5.
Nique—U.S. Appl. No. 16/198,253, filed Nov. 21, 2018.
Nique—U.S. Appl. No. 16/198,327, filed Nov. 21, 2018.
German Search Report dated Sep. 11, 2018 from counterpart German App No. 10 2017 127 866.4.
German Search Report dated Sep. 13, 2018 from counterpart German App No. 10 2017 127 874.5.
German Search Report dated Sep. 19, 2018 from counterpart German App No. 10 2017 127 876.1.

* cited by examiner

PLANETARY GEARING

This application claims priority to German Patent Application Nos. DE102017127874.5 filed Nov. 24, 2017 and DE102017127876.1 filed Nov. 24, 2017, the entirety of both applications are incorporated by reference herein.

The invention relates to a planetary gearing according to the present disclosure.

Planetary gearings are generally known. Among other things, they are used in gear fan engines to provide a gear reduction between a turbine shaft coupled with a turbine and a fan shaft coupled with a fan.

US 2015/0300255 A1 describes a planetary gearing of a gear fan engine in which planet slide bearing pins are respectively arranged in planet gears that are driven by a sun gear and rotate in a stationary ring gear, forming a lubricated journal bearing to the planet gear. The planet slide bearing pins are connected to a torque carrier that is coupled to a fan shaft. Further, it is disclosed that the planet slide bearing pins can be provided with recesses at their ends.

In gear fan engines, planetary gearings are exposed to very high centrifugal forces and torques that deform the planet slide bearing pin and the planet gear and can influence the lubricating film in the slide bearing between these two elements, whereby the functionality of the slide bearing is compromised. In particular, the planet slide bearing pin that is affixed at its ends in support plates is subject to bending as a result of the occurring forces, due to which the thickness of the lubricating film increases in the center of the planet slide bearing pin and is reduced at the ends of the planet slide bearing pin, which leads to an increased lubricating film pressure at the ends of the planet slide bearing pin and to the danger of a metal-on-metal contact occurring between the planet slide bearing pin and the planet gear.

Thus, it is desirable to embody the slide bearing between the planet gear and the planet slide bearing pin in such a manner that no excessive lubricating film pressure occurs at the ends of the slide bearing.

The present invention is based on the objective of providing a planetary gearing as well as a planet gear that facilitate an effective embodiment of the slide bearing between the planet gear and a planet slide bearing pin that is arranged in the planet gear.

This objective is achieved through a planetary gearing with features as disclosed herein. Embodiments of the invention are indicated in present disclosure.

Accordingly, the invention regards a planetary gearing that comprises a sun gear, a plurality of planet gears, a ring gear, and a plurality of planet slide bearing pins. The sun gear rotates about a rotation axis of the planetary gearing and is driven by a sun shaft. Here, the rotation axis of the planetary gearing defines an axial direction of the planetary gearing. The planet gears are driven by a sun gear and are in engagement with the ring gear. Each planet gear has an axially forward face side and an axially rearward face side. A planet slide bearing pin is respectively arranged in an axial opening of a planet gear. The planet slide bearing pin and the planet gear form a lubricated journal bearing, wherein the adjoining contact surfaces of the slide bearing are separated from each other by a slide bearing gap.

The present invention provides that, at its axially forward face side and/or at its axially rearward face side, each planet gear forms a recess that extends starting from the face side inside the planet gear, and that, at their abutment surface, the planet slide bearing pins respectively form a crowning in the sense that their outer diameter decreases from a maximum outer diameter towards at least an axial end of the abutment surface and has a minimum at the axial end. Here, the abutment surface of the planet slide bearing pin formed with a crowning forms a contact surface of the slide bearing, which the planet slide bearing pin forms with the planet gear.

For one thing, the solution according to the invention is based on the idea of influencing and reducing the stiffness of the planet gear by realizing a material recess at the axially forward face side and/or at the axially rearward face side of the planet gear. This facilitates that, in the event that high forces occur at the ends of the slide bearing, the contact surface of the slide bearing formed by the planet gear can be flexibly deformed at its ends, whereby an excessive lubricating film pressure is avoided. Here, the pressure distribution in the slide bearing is shifted away from the ends of the slide bearing towards the center. In addition, the invention provides the advantage that, due to the material recess, the planet gear has a reduced mass and in this way the bearing load is reduced. The invention thus has a positive impact on the stiffness of the planet gear and at the same time reduces its mass.

Here, providing a recess at least at a face side of the planet gear can lead to weight saving in the planet gear of for example up to 10%. The reduced mass of the planet gear can also lead to an advantageous weight reduction of neighboring components of the aircraft engine, as, due to the lower load, they can also be embodied to be lighter.

Based on the shape of the recesses, the degree of stiffness or flexibility of the planet gear can be adjusted along the slide bearings to be able to provide optimal slide bearing functionality across all operational states of the aircraft engine.

For another thing, the solution according to the invention is based on the idea of not forming the planet slide bearing pin in a cylindrical manner, but rather to provide it with a crowning which results in the outer diameter of the planet slide bearing pin being minimal at least at one axial end of the abutment surface. In this manner, an enlarged slide bearing gap and consequently also an enlarged lubricating film thickness is provided at least at one end of the abutment surface. As a result, when deformations and vibrations as caused by the centrifugal forces and introduced torques occur during operation at the ends of the abutment surface, the lubricating film thickness remains sufficiently great at least at one axial end of the abutment surface to avoid excessive lubrication film pressure and the danger of a metal-on-metal contact between the planet slide bearing pin and the planet gear.

The slide bearing is optimized in that during operation contact surfaces that are aligned in parallel are also provided at the axial ends of the slide bearing. The lubricating film thickness has smaller thickness variations across it axial length. Here, the mentioned advantages are achieved without increasing the wall thickness of the planet slide bearing pin. Instead, even a certain weight reduction can be achieved, since the crowning of the abutment surface may be obtained by removing material towards the axial ends of the abutment surface.

By combining a recess at the axially forward face side and/or at the axially rearward face side of the planet gear with a crowning of the planet slide bearing pin, it is achieved that, for one thing, the planet gear has a reduced mass and in this way reduces bearing loads, and, on the other hand, despite the possibility of a flexible deformation of the planet gear at its axial ends, it is reliably avoided that, at its ends, the planet gear comes into metal-on-metal contact with the planet slide bearing pin, as this is specifically avoided by the crowning of the planet slide bearing pin. Rather, a parallel slide bearing gap without nodes and thus an improved load-bearing behavior is provided between the planet slide bearing pin and the planet gear.

In one embodiment of the invention, it is provided that the radial thickness of the recess decreases with an increasing distance to the face side. Thus, the recess converges in the interior of the planet gear and is for example formed in a wedge-shaped or parabolic manner in the longitudinal section. Alternatively, it can be provided that the recess is formed to be cylindrical, i. e. rectangular in the longitudinal section.

In another embodiment of the invention, it is provided that the planet gear has an outer shell surface forming at least one toothing, and an inner shell surface. Here, the outer shell surface and the inner shell surface form the two shell surfaces of an at least approximately hollow-cylindrical planet gear. Here, the inner shell surface represents one of the contact surfaces of the slide bearing to the planet slide bearing pin.

Here, the planet gear has an outer face side area and an inner face side area at least at one face side. The outer face side area extends at the face side from the recess up to the outer shell surface, wherein the outer face side area forms a radially inner face side edge to the recess and a radially outer face side edge to the outer shell surface. Here, the radial distance between the radially inner face side edge and the radially outer face side edge determines the radial thickness of the outer face side area.

The inner face side area extends at the face side from the recess up to the inner shell surface, wherein the inner face side area forms a radially outer face side edge to the recess and a radially inner face side edge to the inner shell surface. Here, the radial distance between the radially inner face side edge and the radially outer face side edge indicates the radial thickness of the inner face side area. The radial thickness of the recess at the face side is defined as the radial distance between the radially inner face side edge of the outer face side area and the radially outer face side edge of the inner face side area.

It is to be understood that the radially outer face side edge and the radially inner face side edge of the outer face side area and/or the radially outer face side edge and the radially inner face side edge of the inner face side area can coincide, and in this case form a common edge. When the radially outer face side edge and the radially inner face side edge of the outer face side area coincide, the recess at the face side extends directly up to the outer shell surface of the planet gear. When the radially outer face side edge and the radially inner face side edge of the inner face side area coincide, the recess extends at the face side directly up to the inner shell surface of the planet gear.

In another embodiment of the invention, it is provided that the radially inner boundary of the recess also forms an angle α to the axial direction adjacent to the inner face side area that is between 0° and 45°. Likewise, it can be provided that the radially outer boundary of the recess also forms an angle β to the axial direction adjacent to the outer face side area that is between 0° and 45°. In embodiments of the invention, the angle α is between 2° and 35°, and the angle β is between 0° and 35°.

The outer shell surface and the inner shell surface respectively have an axial length that can be identical or differing. The thickness of the planet gear is defined by the radial distance between its inner shell surface and the tooth base surface of the toothing of the outer shell surface, which is a cylindrical surface. In embodiments of the invention, it is provided that the ratio of the radial thickness of the recess at the face side to the thickness of the planet gear is in the range of between 0.1 and 0.9. For example, the mentioned ratio is in the range of between 0.2 and 0.8.

In further embodiments of the invention, it is provided that the ratio of the radial thickness of the inner face side area to the thickness of the planet gear is in the range of between 0.01 and 0.6. For example, the mentioned ratio is in the range of between 0.01 and 0.5.

In further embodiments of the invention, it is provided that the ratio of the axial length of the recess (which corresponds to the depth of the recess) to half the axial length of the inner shell surface is in the range of between 0.01 and 0.9. Here, the axial length of the recess extends from the inner face side area of the face side up to a point or area of the recess that has the greatest axial distance from the face side. For example, the mentioned ratio can be in the range of between 0.2 and 0.85.

As has already been mentioned, it can be provided that the axial length of the outer shell surface differs from the axial length of the inner shell surface. Here, the outer shell surface can have a greater or a smaller axial length than the inner shell surface. Alternatively, it can be provided that the axial length of the outer shell surface is identical to the axial length of the inner shell surface.

In another embodiment of the invention, it is provided that, at its end that is formed in the planet gear, the recess is formed by a substantially radially extending surface which transitions via rounded corners into a radially outer boundary and into a radially inner boundary of the recess. In an embodiment alternative hereto, it is provided that, at its end that is formed in the planet gear, the recess is otherwise formed to be circular or concave in the longitudinal section (with respect to the curvature formed in the material).

According to a further embodiment of the invention, it is provided that the radially outer boundary and/or the radially inner boundary of the recess, which extend starting from the face side to the end of the recess that is formed in the planet gear, are formed to be straight, circular or parabolic in the longitudinal section. In general, the design of the shape of the radially outer boundary and the radially inner boundary of the recess can be as desired. Also, it can be provided that the shapes of the radially outer boundary and of the radially inner boundary differ from each other.

According to the present invention, it can be provided that the recess extends in the circumferential direction of the planet gear by 360°, that is, that it is formed to be continuous in the circumferential direction, wherein the planet gear is formed as a rotational body. Alternatively, it can be provided that multiple recesses are provided, respectively extending in the circumferential direction by an angle of less than 180°. Here, such recesses are preferably arranged to be symmetrical to each other, i.e. they are distributed evenly in the circumferential direction. For example, it can alternatively be provided that n recesses are provided, respectively extending in the circumferential direction with an angle range of less than 360°/n, and are separated from each other by webs in the circumferential direction. Here, n represents a non-negative integer.

The toothing of the outer shell surface may for example be embodied as a double helical gearing. Alternatively, for example a simple toothing (e.g. a straight toothing) can be provided.

In the invention, it is provided that the planet gears form a recess at least at one face side. According to one embodiment of the invention, the planet gears form a recess at the axially forward face side as well as at the axially rearward face side. Here, it can be provided that the two recesses are formed to be symmetrical with respect to the axial center of the planet gear, wherein the axial center is defined by half the axial distance between the face sides of the planet gear. The planet gear is thus symmetrical with respect to its axial center.

In contrast, in alternative embodiments of the invention, it can be provided that the recesses formed at both face sides are formed to be asymmetrical with respect to the axial center of the planet gear.

According to one embodiment of the invention, the planet slide bearing pins are coupled with a torque carrier, wherein, with the sun gear rotating and the ring gear being fixedly arranged, the torque carrier rotates about the rotation axis of the planetary gearing with a reduced rotational speed. Here, the torque carrier may for example be coupled with a fan shaft. The planet gears rotate about their own axis as well as about the rotation axis of the planetary gearing, and do so with respectively differing rotational speeds.

Here, it is provided in one embodiment of the invention that the planet slide bearing pins are hollow on the inside and are configured for receiving a support slide bearing pin of a torque carrier, with a torque transmission occurring via the support slide bearing pin.

Alternatively, it can be provided that the planet slide bearing pins are fixedly connected to a forward support plate and to a rearward support plate, wherein the forward support plate is coupled with the torque carrier for the purpose of torque transmission. Here, the planet slide bearing pins can for example be welded or screwed together with the support plates.

With respect to the configuration of the planet slide bearing pins with a crowing, it is provided according to one embodiment variant that the planet slide bearing pins form a crowning at their outer-side abutment surface, namely in the sense that, from a maximum outer diameter, their outer diameter decreases towards at least one axial end of the abutment surface and has a minimum at the axial end. Here, the abutment surface of the planet slide bearing pin formed with a crowning forms a contact surface of the slide bearing that the planet slide bearing pin forms with the planet gear.

Here, according to this embodiment variant, it can further be provided that the planet slide bearing pins form a crowning at their abutment surface in such a manner that their outer diameter decreases towards both axial ends of the abutment surface and has a minimum at both axial ends. In particular, it can be provided that the planet slide bearing pin has the minimum outer diameter at both axial ends of the abutment surface, and has the maximum outer diameter between the axial ends, wherein the minimum outer diameters can be identical or differing at the two ends.

Thus, according to this embodiment variant, the outer diameter is minimal at both axial ends, i. e. it decreases towards both axial ends. In this way, it is specifically not provided that the outer diameter extends continuously adjacent to the axial ends, in which case the axial ends would be formed cylindrically. Alternatively, the outer diameter has a maximum outer diameter at the one axial end of the abutment surface, wherein the outer diameter continuously decreases towards the other axial end up to a minimum.

Accordingly, it can be provided that the difference between the maximum outer diameter and the outer diameter at a regarded axial position of the planet slide bearing pin continuously increases towards both axial ends or towards one axial end of the planet slide bearing pin. For the slide bearing gap, this means that it also increases towards the axial ends of the planet slide bearing pin, as regarded in the assembled state without any loading and in the non-rotating state. Here, it is assumed that the contact surface of the planet gear forming the other surface of the slide bearing is cylindrically formed. During operation or under load, the planet gear nestles against the planet slide bearing pin, so that an even gab is created across the axial length.

In a further embodiment, it is provided that the abutment surface of the planet slide bearing pin forms a first convex curve in the longitudinal section, extending between the maximum of the outer diameter and the forward axial end of the abutment surface, and forms a second convex curve extending between the maximum of the outer diameter and the rearward axial end of the abutment surface. Here, the convex curve can in general be formed in any desired manner. In exemplary embodiments, it is provided that the first curve and/or the second curve is formed as a circular arc, that the first curve and/or the second curve is formed in a parabolic manner, or that the first curve and/or the second curve is formed in a rectilinear manner. In the latter case, the abutment surface of the planet slide bearing pin conically converges towards its axial ends. It can also be provided that the first curve and/or the second curve are comprised of multiple curve portions that are differently bent. Here, it can further be provided that one or multiple of these curve portions are formed in a rectilinear/linear manner.

In one embodiment, the maximum of the outer diameter of the planet slide bearing pin is formed according to the regarded embodiment variant by a circumferential line (which extends in the circumferential direction of the planet slide bearing pin). Thus, the maximum forms a point in the longitudinal section of the planet slide bearing pin. This means that the mentioned first curve and the mentioned second curve steadily transition into each other, so that the abutment surface can be formed by a single bent curve (which can be comprised of differently bent curve portions in the embodiment variants). Accordingly, it can be provided in some embodiments that the abutment surface of the planet slide bearing pin is formed to be completely circular or parabolic with a maximum of the outer diameter in the axial center of the planet slide bearing pin or alternatively outside the axial center of the planet slide bearing pin.

In one embodiment of the invention it is provided that the ratio of half the difference between the maximum outer diameter and the minimum outer diameter of the planet slide bearing pin to the maximum outer diameter is between 0.00005 and 0.005. Here, the indicated half of the difference specifically refers to the crowning of the planet slide bearing pin. If the planet slide bearing pin has different minimal outer diameters at the two axial ends of the abutment surface, the mentioned ratio respectively applies with respect to the maximum outer diameter and the minimum outer diameter at the respectively regarded axial end.

In further variants of the invention it is provided that the planet slide bearing pin has a maximum of its outer diameter in the axial center (i.e. centrally between the axial forward end and the axially rearward end of the abutment surface). The planet slide bearing pin is formed to be mirror-symmetrical with respect to its axial center. However, this is not necessarily the case. In alternative variants of the invention it is provided that the planet slide bearing pin has a maximum of its outer diameter outside its axial center, and is correspondingly formed asymmetrically with respect to its axial center.

According to one embodiment of the invention, the planet slide bearing pin is formed as a rotational body, i.e. it is rotationally symmetrical with respect to the longitudinal axis of the slide bearing pin. However, this is not necessarily the case. According to alternative embodiments, the planet slide bearing pin has an abutment surface with a crowned design only across a circumferential angle that is smaller than 360°, in particular in the range of ±60° about the nominally loaded area. Thus, the crowned profile of the planet slide bearing pin according to the invention does not extend over the entire circumference of the planet slide bearing pin, but only over a defined angular range in the circumferential direction. The described positive effect on the slide bearing is achieved also in such an embodiment. In addition, the oil consumption for lubrication is reduced, since an increased lubricating film thickness at the axial ends is not provided over the entire circumference.

If the planet slide bearing pin is formed in a rotationally symmetrical manner, the outer diameter at a regarded axial position is the same for all points of a circumferential line. If the planet slide bearing pin is not formed in a rotationally symmetrical manner, the largest outer diameter is considered the outer diameter of a regarded axial position within the meaning of the present invention.

According to one embodiment of the invention, the planet slide bearing pin has an axial forward end and an axial rearward end, which are arranged at an axial distance to the axially forward end and the axially rearward end of the abutment surface, wherein, at its forward axial end, the planet slide bearing pin is connected to a forward support plate and, at its rearward axial end, is connected to a rearward support plate. Thus, the planet slide bearing pin extends at both ends to beyond the abutment surface, and there is respectively connected to a support plate. Thus, it has to be differentiated between the axial ends of the abutment surface and the axial ends of the planet slide bearing pin.

In another embodiment of the invention it is provided that the planet slide bearing pins have an axial opening on the inside and are formed for the purpose of receiving a support slide bearing pin of a torque carrier therein.

According to one embodiment of the invention, the planet slide bearing pins are coupled with a torque carrier, wherein, when the sun gear rotates and the ring gear is fixedly arranged, the torque carrier rotates with a reduced speed about the rotation axis of the planetary gearing. Here, the torque carrier may for example be coupled to a fan shaft. The planet gears thus rotate about their own axis as well as about the rotation axis of the planetary gearing, respectively doing so with different rotational speeds.

Here, it is provided in one embodiment of the invention that the planet slide bearing pins are hollow inside and configured for the purpose of receiving a support slide bearing pin of a torque carrier, with a torque transmission occurring via the support slide bearing pin.

Alternatively, it can be provided that the planet slide bearing pins are fixedly connected to a forward support plate and with a rearward support plate, wherein the forward support plate is coupled to the torque carrier for torque transmission. Here, the planet slide bearing pins can for example be screwed or welded together with the support plates.

The planet slide bearing pin of the present invention has an outer-side abutment surface with a crowned design. Here, the planet slide bearing pin, which is usually hollow, i.e. provided with an axial opening or bore, can generally have any desired design at its interior surface. For example, the planet slide bearing pin can be formed to be hollow-cylindrical on the inside, that is, to have an axial opening with a constant diameter. In other embodiment variants, it can be provided that the inner diameter of the planet slide bearing pin varies along its axial extension.

Thus, it is provided in a further embodiment variant of the invention that the inner diameter of the axial bore of the planet slide bearing pin varies between the axially forward end and the axially rearward end of the inner surface, and at that has a maximum at least at one axial end. This embodiment variant is based on the idea of not forming the planet slide bearing pin in the area of the axial bore in a cylindrical manner, but rather to provide it with an inner diameter that varies in the axial direction, wherein the inner diameter has a maximum at least at an axial end of the inner surface. Accordingly, along its axial extension, the planet slide bearing pin shows a change of its wall thickness that results from the changing diameter of the axial bore. Here, the wall thickness of the planet slide bearing pin is minimal at least at an axial end of the inner surface (corresponding to a maximum inner diameter of the axial bore). In embodiments of the invention, the wall thickness of the planet slide bearing pin is minimal at both axial ends of the inner surface. Between the axial ends, the planet slide bearing pin has a maximal wall thickness (corresponding to a minimum inner diameter of the axial bore). What is provided is a structure in which the planet slide bearing pin has a greater wall thickness in the center than at its axial ends (or than at least at one of its axial ends), whereby the stiffness of the planet slide bearing pin is increased, and correspondingly loads and wear are reduced.

In one embodiment of this invention variant, it is provided that internally the planet slide bearing pin is formed in such a manner that it has maximal inner diameters at both axial ends of the inner surfaces and a minimum inner diameter between the axial ends, wherein the maximum inner diameters can be identical or differing at the two axial ends. Thus, according to this embodiment variant, the inner diameter is maximal at both axial ends. In an alternative embodiment, the inner diameter is minimal at the one axial end of the inner surface, wherein the inner diameter continuously increases towards the other axial end up to a maximum.

Further, it can be provided that the inner diameter of the axial bore of the planet slide bearing pin continuously increases towards at least one axial end of the inner surface, wherein the maximum inner diameter is only reached at the axial position of the respective axial end of the inner surface.

In a further embodiment of this invention variant, it is provided that the inner surface of the planet slide bearing pin forms a first curve in the longitudinal section which extends between the minimum and the forward axial end, and forms a second curve that extends between the minimum and the rearward axial end. Here, the first and the second curve can in general be formed in any desired manner. In exemplary embodiments, it is provided that the first curve and/or the second curve is formed as a circular arc, that the first curve and/or the second curve is formed in a parabolic manner, or that the first curve and/or the second curve is formed in a rectilinear manner.

In the last case, the axial bore is formed according to one embodiment variant as a double conical bore, which respectively tapers off conically from the axial ends towards the axial center of the bore.

In one embodiment, the minimum of the inner diameter of the planet slide bearing pin is formed by a circumferential line (which extends in the circumferential direction of the planet slide bearing pin at the inner surface). Thus, in the longitudinal section of the planet slide bearing pin, the minimum is a point. This means that the mentioned first curve and the mentioned second curve transition into each other directly. In one alternative embodiment, it is provided that the minimum of the inner diameter of the planet slide bearing pin is formed by a cylindrical area with a constant inner diameter extending across a defined axial length. According to one embodiment variant, this axial length is dimensioned in such a manner that the ratio of the axial length of the cylindrical area to the axial total length of the abutment surface is between 0 and 0.75.

Such a cylindrical plateau area can be formed in the center or off-center. Circular, parabolic or rectilinear surfaces may connect to it in the longitudinal section, for example.

In a further variant of the invention, it is provided that the planet slide bearing pin has a minimum of its inner diameter in its axial center (i.e. centrally between the axially forward end and the axially rearward end of the inner surface). The planet slide bearing pin is formed to be mirror-symmetrical with respect to its axial center. However, this is not necessarily the case. In alternative variants of the invention, it is provided that the planet slide bearing pin has a minimum of its inner diameter outside its axial center, and correspondingly is formed to be asymmetrical with respect to its axial center.

In a further aspect of the invention, the invention relates to a planet gear for a planetary gearing that has an axially forward face side and an axially rearward face side. It is provided that the planet gear has a recess at its axially forward face side and/or at its axially rearward face side, extending inside the planet gear starting from the face side. The advantageous embodiments according which are explained with respect to the planetary gearing also apply to the planet gear.

In a further aspect of the invention, the invention relates to a gear fan engine that comprises a fan stage, a fan shaft via which the fan stage is driven, and a turbine shaft. The turbine shaft may for example be a shaft that is coupled to a low-pressure turbine or a medium-pressure turbine of the engine. It is provided that the turbine shaft and the fan shaft are coupled via a planetary gearing according to the present disclosure, wherein the turbine shaft forms the sun shaft, the planet slide bearing pins are coupled to a torque carrier, and the torque carrier is coupled to the fan shaft.

It is to be understood that the present invention is described with respect to a cylindrical coordinate system, having the coordinates x, r and φ. Here, x indicates the axial direction, r indicates the radial direction, and φ indicates the angle in the circumferential direction. Here, the axial direction is defined by the rotation axis of the planetary gearing, which is identical with the machine axis of a gear fan engine inside of which the planetary gearing is arranged. Beginning at the x-axis, the radial direction points radially outward. Terms such as "in front", "behind", "frontal" and "rear" always refer to the axial direction or the flow direction inside the engine inside of which the planetary gearing is arranged. Terms such as "outer" or "inner" refer to the radial direction.

In the following, the invention is explained in more detail based on multiple exemplary embodiments by referring to the Figures of the drawing. Herein:

FIG. 1 shows a simplified schematic sectional rendering of a gear fan engine;

FIG. 2 shows a sectional rendering of elements of a planetary gearing that is suitable for being used in a gear fan engine, wherein a sun shaft, a sun gear, a planet gear, a planet slide bearing pin and a support slide bearing pin of a torque carrier are shown, and wherein, at its axially forward face side and at its axially rearward face side, the planet gear forms a recess that extends inside the planet gear starting from the face side;

Figure 1:
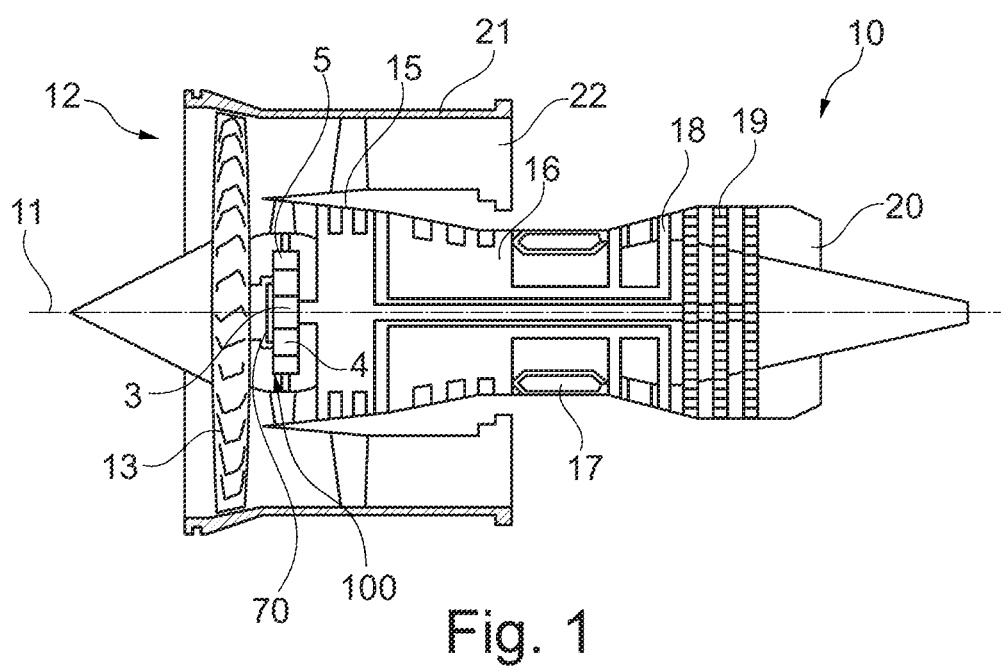

FIG. 1 shows a gear fan engine 10 with a rotation axis 11 that is provided for being used in airplanes. In the direction of the axial through flow, the gear fan engine 10 successively comprises an air intake 12, a fan stage 13 (in general also more than one fan stage 13 is possible), a gear 100, a medium-pressure compressor 15, a high-pressure compressor 16, a combustion device 17, a high-pressure turbine 18, a medium-pressure turbine 19, and a nozzle 20. A fan housing 21 surrounds the fan stage 13 and defines the air intake 12.

In general, the gear fan engine 10 operates in a conventional manner, wherein air entering the intake 12 is accelerated by the fan stage 13. Here, two air flows are created. A first flow flows into the medium-pressure compressor 15, a second air flow flows through a bypass channel 22, wherein the second air flow provides the greatest portion of the thrust of the gear fan engine 10. The medium-pressure compressor 15 compresses the entering air flow before it reaches the high-pressure compressor 16 inside of which further compression occurs. The compressed air that is discharged from the high-pressure compressor 16 is introduced into the combustion device 17 where it is intermixed with fuel, and the mixture is then combusted. The hot combustion gases are decompressed in the high-pressure turbine 18 and in the medium-pressure turbine 19 before being discharged through the nozzle 20, and thus providing additional thrust.

Thus, the gear fan engine 10 forms a bypass channel 22 and a primary flow channel behind the fan stage 13. The primary flow channel leads through the core engine (gas turbine) that comprises the medium-pressure compressor 15, the high-pressure compressor 16, the combustion device 17, the high-pressure turbine 18, and the medium-pressure turbine 19. The bypass channel 22 guides air which is sucked in by the fan stage 13 during operation of the gear fan engine 10 past the core engine.

Via shaft devices, the high-pressure turbine 18 and the medium-pressure turbine 19 respectively drive the high-pressure compressor 16 and the medium-pressure compressor 15. A medium-pressure shaft drives the fan stage 13 via the gear 100. Here, the gear 100 is embodied as a reduction gear which reduces the rotational speed of the fan stage 13 as compared to the medium-pressure compressor 15 and to the medium-pressure turbine 19. In the shown embodiment, the gear 100 is a planetary gearing with a static ring gear 5 and circumferential planet gears 4 rotating in the ring gear 5. The gears 100 are driven via a sun gear 3 that is coupled to the medium-pressure shaft. In the shown embodiment, the drive is provided via a torque carrier 70 that is coupled to the planet gears 4.

In general, also other embodiments of the gear 100 are possible, wherein e.g. the ring gear 5 can be formed in a movable manner, so that the drive is provided via the ring gear 5.

The embodiment of the gear fan engine 10 according to FIG. 1 is to be understood merely as an example. In particular, the arrangement of the shafts can also be chosen to be different, wherein in general arrangements with two or three shafts are possible. For example, a three-shaft arrangement can alternatively be provided that comprises a low-pressure shaft connecting the low-pressure turbine to the fan, a medium-pressure shaft connecting the medium-pressure turbine to the medium-pressure compressor, and a high-pressure shaft connecting the high-pressure turbine to the high-pressure compressor. Here, the fan stage 13 is connected via a gear to the low-pressure shaft. Further, if the turbofan engine does not have a medium-pressure compressor and a medium-pressure turbine, only a low-pressure shaft and a high-pressure shaft can be present, with the fan stage 13 again being connected via a gear to the low-pressure shaft.

With the rotation axis 11, the described components have a common rotational or machine axis. The rotation axis 11 defines an axial direction of the engine 10. A radial direction of the engine 10 extends perpendicular to the axial direction.

What is relevant in the context of the present invention is the embodiment of the planetary gearing 100.

Figure 2:
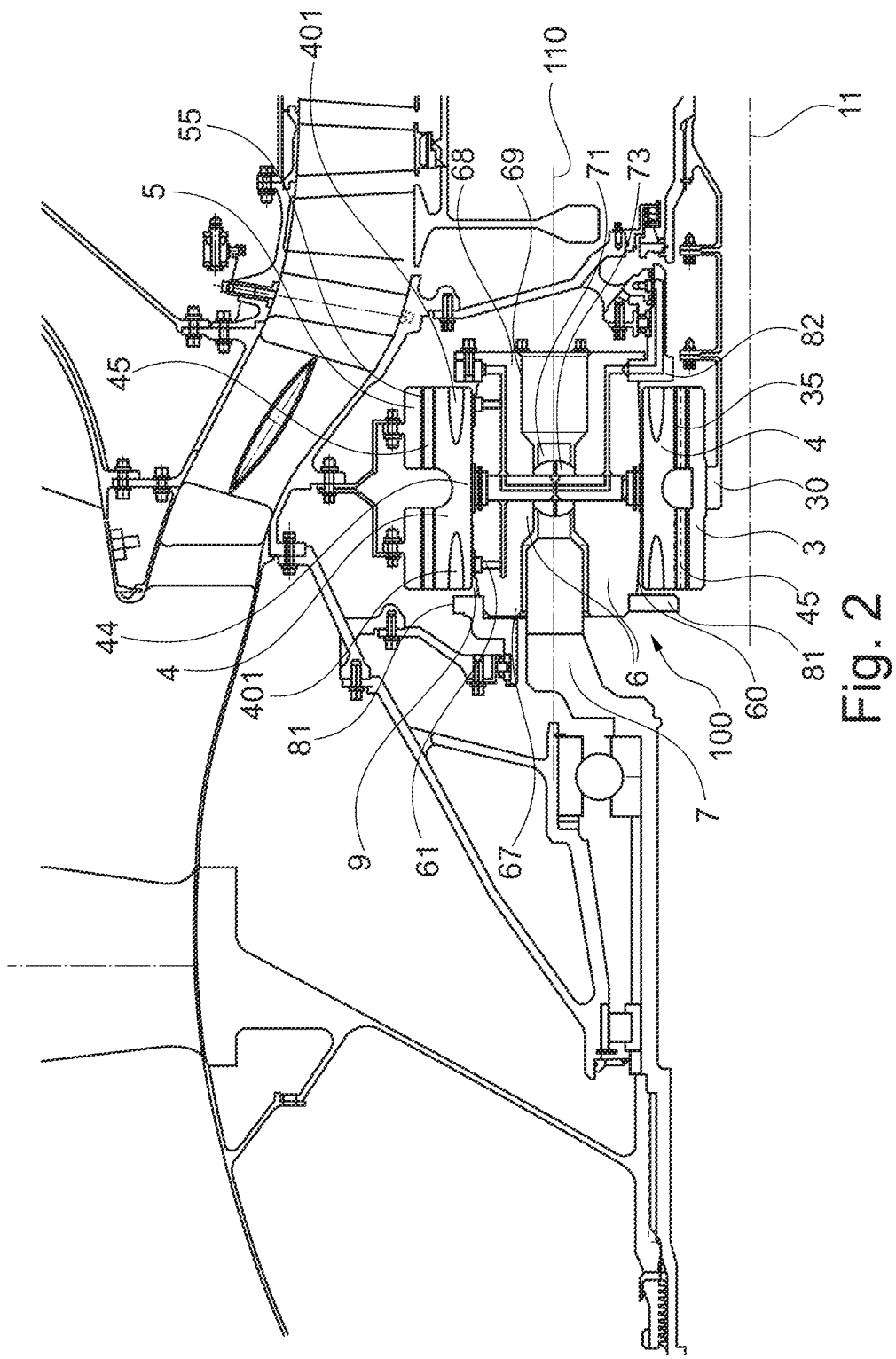

FIG. 2 shows an exemplary embodiment of a planetary gearing 100 in a sectional rendering. The planetary gearing 100 comprises a sun gear 3 that is driven by a sun shaft 30. The sun shaft 30 may for example be the medium-pressure shaft of FIG. 1. Here, the sun gear 3 and the sun shaft 30 rotate about a rotation axis 11 that defines an axial direction of the planetary gearing 100.

The planetary gearing 100 further comprises a plurality of planet gears 4 of which one is shown in the sectional rendering of FIG. 2. The sun gear 3 drives the plurality of planet gears 4, wherein a toothing 35 of the sun gear 3 is in engagement with the toothing 45 of the planet gear 4. The toothing 35, 45 may for example be a double helical gearing.

The following description of a planet gear 4 applies to all planet gears that are driven by a sun gear 3. The planet gear 4 is configured as a hollow cylinder and forms an outer shell surface and an inner shell surface 44, as will be described in more detail with respect to FIGS. 3 and 4. Driven by the sun gear 3, the planet gear 4 rotates about a rotation axis 110 that extends in parallel to the rotation axis 11. The outer shell surface of the planet gear 4 forms a toothing 45 that is in engagement with the toothing 55 of a ring gear 5. The toothings 45, 55 can also be formed as double helical gearing. The ring gear 5 is arranged in a stationary, i.e. non-rotating, manner. The planet gears 4 rotate as a result of being coupling with the sun gear 3, and in doing so travel along the circumference of the ring gear 5. The rotation of the planet gears 4 along the circumference of the ring gear 5 is slower than the rotation of the sun shaft 3, whereby a gear reduction is provided.

Adjacent to its inner shell surface 44, the planet gear 4 has a centered axial opening. Inserted into the opening is a planet slide bearing pin 6, wherein the planet slide bearing pin 6 and the planet gear 4 form a lubricated journal bearing at their facing surfaces. For lubricating the slide bearings, radially extending lubricating film openings 61 can be formed in the planet slide bearing pin 6, through which lubricating oil that is sprayed in from the inside or supplied in another manner can be supplied into a slide bearing gap 9 between the planet slide bearing pin 6 and the planet gear 4. Here, it is to be understood that also additional or other kinds of means for supplying lubricating oil to the slide bearing can be provided in the planet slide bearing pin 6.

During operation, the planet gear 4 and the planet slide bearing pin 6 do not have the exact same axis, since the slide bearing with its hydrodynamic design entails an eccentricity in the range of tenths of a millimeter.

The planet slide bearing pin 6 has an outer-side abutment surface 60 that is formed in a crowned manner. Accordingly, the outer diameter of the planet slide bearing pin decreases towards the axial ends of the abutment surface 60 and has a minimum there.

Adjacent to its inner surface 69, the planet slide bearing pin 6 also has an axial opening or bore and is provided for the purpose of receiving a support slide bearing pin 7 of a torque carrier therein. At that, the support slide bearing pin 7 is mounted in a tapering area 71 of the support slide bearing pin 7 in a joint bearing 73 inside the bore of the planet slide bearing pin 6. The joint bearing 73 allows for a certain degree of tilting of the support slide bearing pin 7 with respect to the rotation axis 110. A support slide bearing pin 7 is arranged in each of the planet slide bearing pins 6 of the planetary gearing 100. At their ends that project from the opening of the planet slide bearing pin 6, the support slide bearing pins 7 are fixedly connected to each other and at that form a torque carrier corresponding to the torque carrier 70 of FIG. 1. The torque carrier forms a drive element of the planetary gearing and is coupled to the fan shaft or in general to the output shaft.

Here, the exact shape of the support slide bearing pin 7 and its shown mounting at the inner surface of the planet slide bearing pin 6 are to be understood merely as an example. It is also to be understood that a coupling of the planet slide bearing pin 6 to the torque carrier can also be realized in a different manner, as shown based on FIGS. 4 and 5 by way of example.

FIG. 2 further shows a forward support plate 81 and a rearward support plate 82. The planet slide bearing pin 6 is affixed at the forward support plate 81 and at the rearward support plate 82, for example it may be screwed or welded together with them. For this purpose, it is provided that the planet slide bearing pin 6 has an axially forward end 67 and an axially rearward end 68 which respectively axially protrude with respect to the ends of the abutment surface 60, wherein the planet slide bearing pin 6 is attached at the support plates 81, 82 at the ends 67, 68.

The planet gear 4 is formed in such a manner that it has respectively one recess 401 at its face sides, extending from the face side substantially in the direction of the axial center of the planet gear and correspondingly inside the planet gear 4. The structure of the planet gear 4 and of the planet slide bearing pin 6 will be explained in more detail in the following with respect to FIG. 3, which represents a section of FIG. 2.

Figure 3:
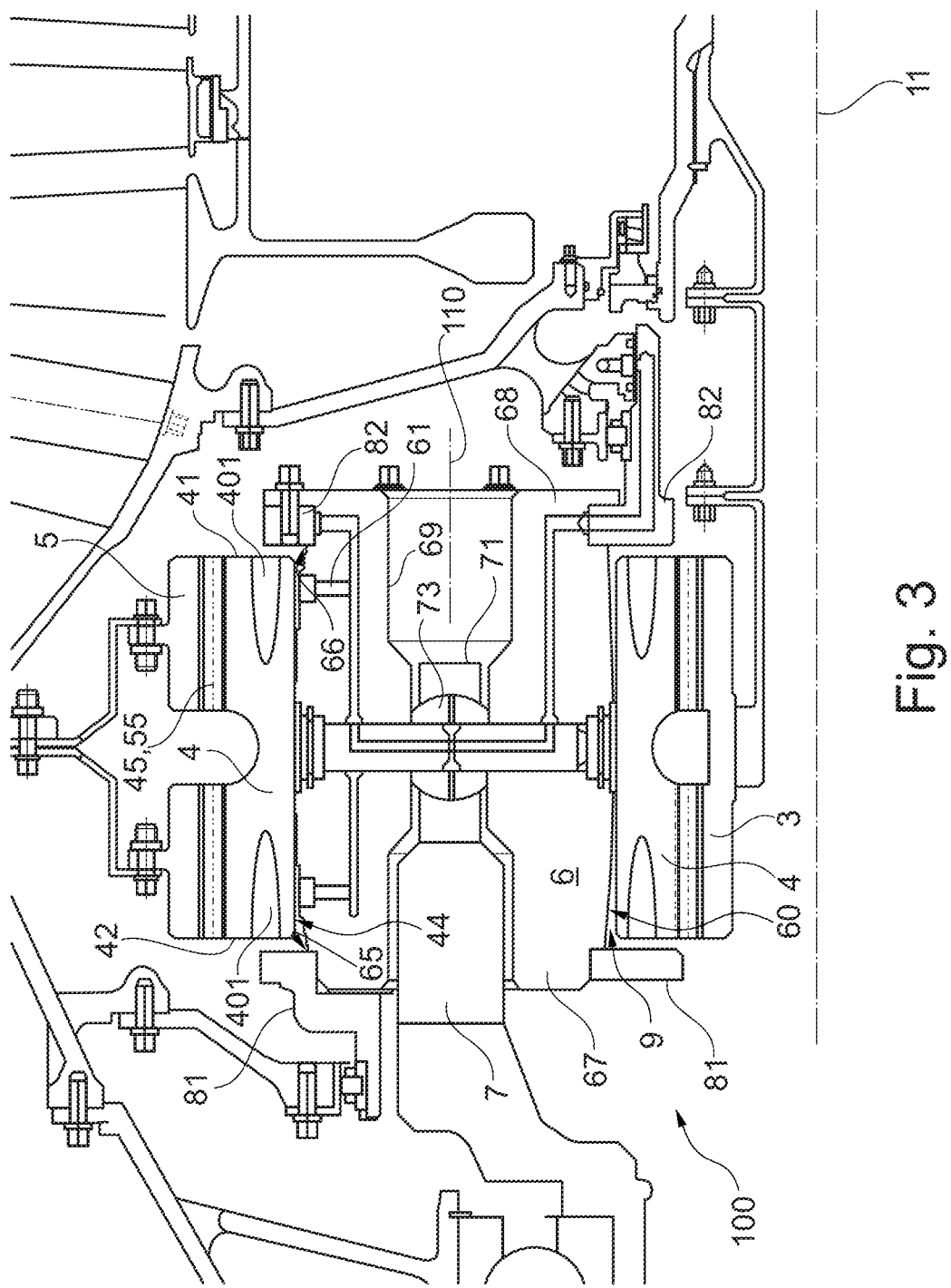
FIG. 3 shows an enlarged rendering of the planet gear and of the planet slide bearing pin of FIG. 2.

As can be seen in FIG. 3, at its two face sides 41, 42, the planet gear 4 forms respectively one recess 401 that extends from the face side 41, 42 substantially in the axial direction (or starting from the face side 41 counter to the axial direction) into the interior space of the planet gear 4. In this way, the mass of the planet gear 4 and the stiffness of the planet gear 4 are reduced towards its face sides 41, 42.

The slide bearing between the planet slide bearing pin 6 and the planet gear 4 is formed by the cylindrical inner shell surface 44 of the planet gear 4 and the abutment surface 60 of the planet slide bearing pin 6 that is provided with a crowning. Here, due to the curvature of the abutment surface 60, the slide bearing gap 9 formed in the area of the slide bearing increases in radial thickness towards the axially forward end and towards the axially rearward end of the slide bearing. However, in the event that strong torques and centrifugal forces occur, the adjacent surfaces 44, 60 of the slide bearing can align to be substantially in parallel at its ends. This is also supported by the recesses 401 that are formed in the planet gear 4, which provide the latter with an increased flexibility at its ends.

Figure 4:
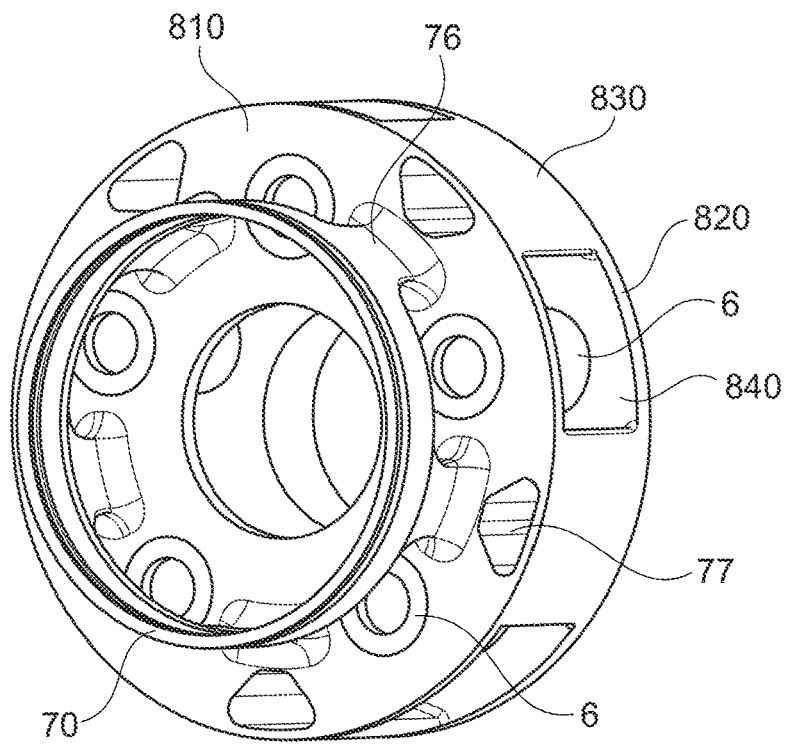
FIG. 4 shows a rendering of elements of an alternative planetary gearing in which, in contrast to the planetary gearing of FIGS. 2 and 3, no support slide bearing pin is provided, and a torque transmission to a torque carrier instead occurs via a support plate that is fixedly connected to the planet slide bearing pins.
Figure 5:
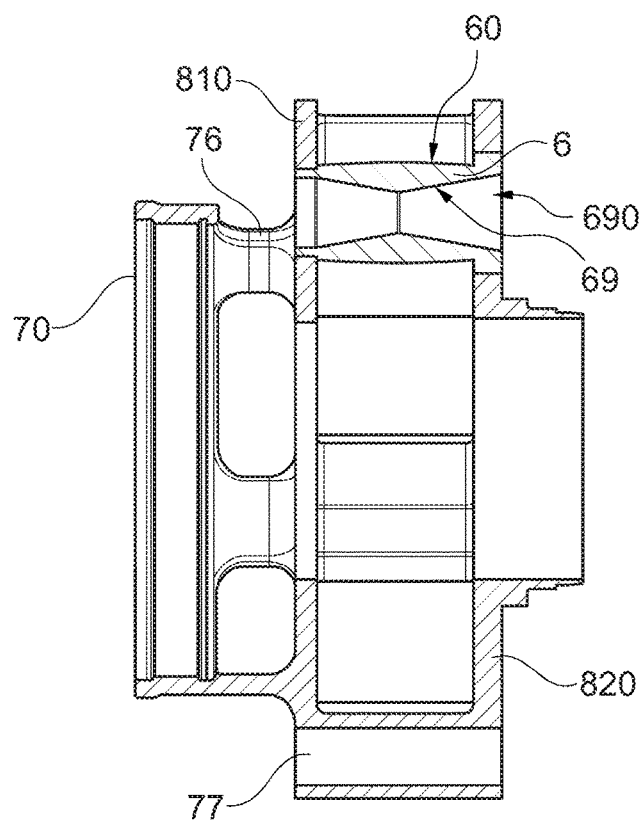
FIG. 5 shows elements of the planetary gearing of FIG. 4 in a partially sectioned view.

FIGS. 4 and 5 show elements of a further planetary gearing. In general, the planetary gearing of FIGS. 4 and 5 has the same structure as the planetary gearing of FIGS. 2 and 3. It only differs in the manner in which the torque is received and transmitted to a torque carrier (corresponding to the torque carrier 70 of FIG. 1). FIG. 4 only shows such elements of the planetary gearing that relate to this different manner of torque transmission. The other elements that are not shown correspond to the embodiment of FIGS. 2 and 3. In particular, the gear comprises a sun gear, a sun shaft, a plurality of planet gears driven by the sun gear, and a ring gear, as has been explained with respect to FIGS. 2 and 3 t.

As can be seen in FIGS. 4 and 5, the planet slide bearing pins 6 are fixedly connected to a forward support plate 810 and a rearward support plate 820. For example, they may be fixedly screwed or welded together with the support plates 810, 820. Just like in the exemplary embodiment of FIGS. 2 and 3, the planet slide bearing pin 6 respectively has one crowned outer-side abutment surface 60. At its inner surface 69, the planet slide bearing pin 6 forms a bore 690, with its inner diameter decreasing towards the axial center of the planet slide bearing pin. In the shown exemplary embodiment, the bore 690 is formed as a double cone. This will be explained in more detail with respect to FIGS. 17 and 18.

In contrast to the exemplary embodiment of FIGS. 2 and 3, the axial bore 690 of the planet slide bearing pin 6 does not receive a support slide bearing pin of a torque carrier, but is empty. There is no support slide bearing pin. The transmission of a torque onto a torque carrier 70 is realized via connecting webs 76 that fixedly connect the torque carrier 70 to the forward support plate 810. In the shown exemplary embodiment, the torque carrier 70 is formed as a ring. However, this is to be understood merely as an example. The torque carrier 70 is coupled to the fan shaft in a manner that is not shown.

In the exemplary embodiment of FIGS. 4 and 5, the torque carrier 70, the forward support plate 810 and the rearward support plate 820 are formed in one piece, while in the exemplary embodiment of FIGS. 2 and 3 they are formed in three pieces. By combining the torque carrier and the support plates into one part, the support slide bearing pin 7 of FIGS. 2 and 3 can be omitted. The reception of the torque does no longer occur centrally in the bore of the planet slide bearing pin 6, but by the forward support plate 810. Accordingly, in the exemplary embodiment of FIGS. 4 and 5, there is also no joint bearing (corresponding to the joint bearing 73 of FIGS. 2 and 3) needed.

As for the one-piece structure of the forward support plate 810, the rearward support plate 820 and the torque carrier 70, it is further remarked that the forward support plate 810 and the rearward support plate 820 are connected to each other by wall surfaces 830 formed at the circumference, with respectively substantially rectangular recesses 840 being located in between them which serve for receiving respectively one planet gear. Further, the structural unit formed by the two support plates 810, 820 and the torque carrier 70 has axial bores 77 that may serve for coupling further parts (not shown) for torque transmission.

The shown number of five planet slide bearing pins 6, five connecting webs 76 and five axial bores 77 is to be understood merely as an example.

Figure 6:
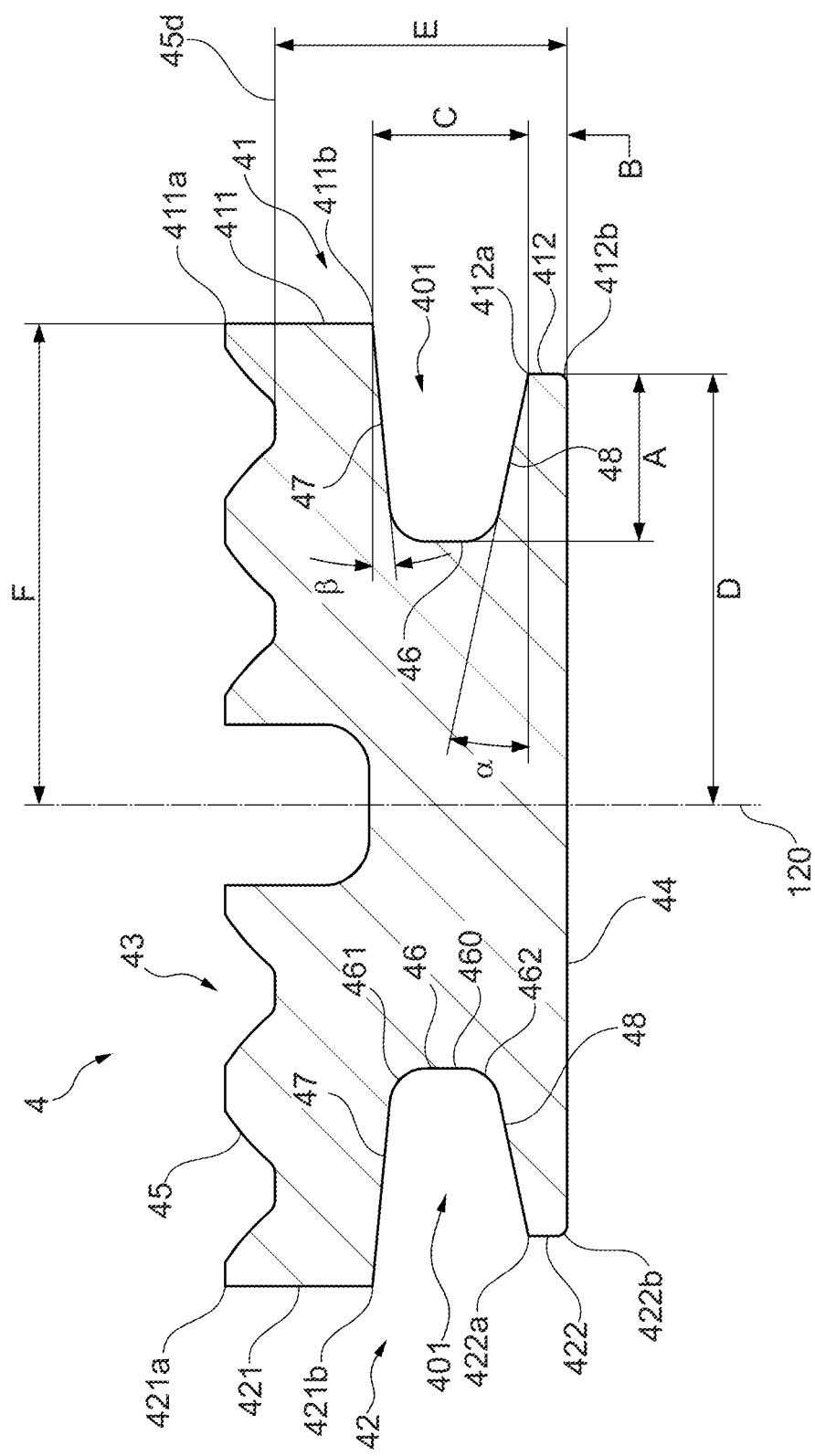
FIG. 6 shows a sectional rendering of the planet gear corresponding to FIGS. 2 and 3.

FIG. 6 shows the structure of the planet gear 4 while also systematically rendering the relevant parameters. The planet gear 4 is formed to have an approximately hollow-cylindrical shape, as well as an outer shell surface 43 and an inner shell surface 44. In the area of the outer shell surface 43, a toothing 45 is formed, which may for example be a double helical gearing. The outer shell surface 43 has an axial length of 2*F. The inner shell surface 44 has an axial length of 2*D. The outer shell surface 43 can have a greater, identical or smaller axial length than the shell surface 44, i.e. D can be smaller than F, equal to F, or larger than F.

The thickness E of the planet gear 4 is defined by the radial distance between its inner shell surface 44 and the cylindrical tooth base surface 45$d$ of the toothing 45 of the outer shell surface 43.

The planet gear 4 has an axially forward face side 42 and an axially rearward face side 41. Each of the face sides comprises an outer face side area 421, 411 and an inner face side area 422, 412. The outer face side area 421 of the axially forward face side 42 extends at the face side 42 from the recess 401 up to the outer shell surface 43, wherein the outer face side area 421 forms a radially inner face side edge 421$b$ to the recess 401 and a radially outer face side edge 421$a$ to the outer shell surface 43. In a corresponding manner, the outer face side area 411 extends at the axially rearward face side 41 from the recess 401 up to the outer shell surface 43, wherein the outer face side area 411 forms a radially inner face side edge 411$b$ to the recess 401 and a radially outer face side edge 411$a$ to the outer shell surface 43.

The inner face side area 422 of the axially forward face side 42 extends at the face side 42 from the recess 401 up to the inner shell surface 44, wherein the inner face side area 422 forms a radially outer face side edge 422$a$ to the recess 401 and a radially inner face side edge 422$b$ to the inner shell surface 44. In a corresponding manner, the inner face side area 412 extends at the axially rearward face side 41 from the recess 401 up to the inner shell surface 44, wherein the inner face side area 412 forms a radially outer face side edge 412$a$ to the recess 401 and a radially inner face side edge 412$b$ to the inner shell surface.

The radial thickness C of the recess 401 at the face side 41 of the planet gear 4 is defined as the radial distance between the radially inner face side edge 411$b$ of the outer face side area 411 and the radially outer face side edge 412$a$ of the inner face side area 412. In a corresponding manner, the radial thickness C is defined at the other face side 42 of the planet gear 4.

The radial thickness B of the inner face side area 412 is defined by the radial distance between the edges 412$a$ and 412$b$. Here, it applies that B plus C is less than E.

The recess 401 comprises respectively one radially outer boundary 47 and a radially inner boundary 48, which respectively extend starting from the face side 41, 42 to the end 46 of the recess 401 that is formed in the planet gear 4. Here, the outer boundary 47 and the inner boundary 48 can generally have any desired shape. In the shown exemplary embodiment, they extend in a substantially planar manner, which is why they are shown to be substantially rectilinear in the sectional rendering of FIG. 6. However, this is not necessarily the case. Alternatively, the outer boundary 47 and the inner boundary 48 can for example be curved in a circular or parabolic manner.

In the exemplary embodiment of FIG. 6, the end 46 of the recess 401 that if formed in the planet gear has a substantially radially extending surface 460 that transitions via rounded corners 461, 462 into the radially outer boundary 47 and the radially inner boundary 48 of the recess 401. Alternatively, such a substantially radially extending surface 460 is not provided, and the end 46 of the recess is for example formed to be semicircular or parabolic in the longitudinal section.

According to FIG. 6, the radial thickness C of the recess decreases with increasing distance to the face side, i.e. in the direction of the end 46 of the recess. For a more precise definition of the profile of the recess, the angles $\alpha$ and $\beta$ are defined in FIG. 6. The angle $\alpha$ is that angle which the radially inner boundary 48 of the recess 401 forms adjacent to the inner face side area 412 with respect to the axial direction. The angle $\beta$ is that angle which the radially outer boundary 47 of the recess 401 forms adjacent to the outer face side area 411 with respect to the axial direction. Both angles may for example be in the range between 0° and 45°.

The axial length A of the recess 401 is defined as the axial distance between the inner face side area 412 of the face side 41 and the axial position of the end 46 of the recess 401. The mentioned definitions apply in a corresponding manner to the recess 401 at the other face side 42.

FIG. 6 also shows the axial center 120 of the planet gear 4. The planet gear 4 is mirror-symmetrical with respect to its axial center 120. However, this is not necessarily the case, as will be explained based on FIG. 15.

In embodiments of the invention, the planet gear 4 realizes certain ratios of the parameters A, B, C and E, as defined above.

Thus, the following applies with respect to the ratio of the radial thickness C of the recess 401 to the thickness E of the planet gear: $0.1 \leq C/E \leq 0.9$.

The following applies with respect to the ratio of the radial thickness B of the inner face side area 412 to the thickness E of the planet gear: $0.01 \leq B/E \leq 0.6$.

The following applies with respect to the ratio of the axial length A of the recess 401 to half the axial length D of the inner shell surface 44: $0.01 \leq A/D \leq 0.9$.

The planet gear 4 shown in FIG. 6 is formed in a rotationally symmetrical manner.

Figure 7:
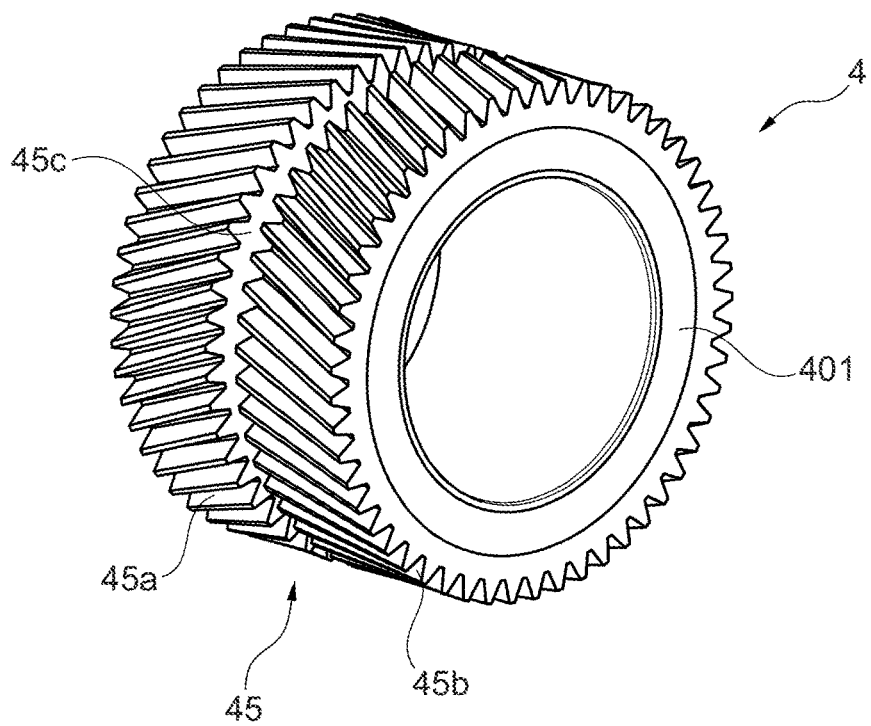
FIG. 7 shows a perspective rendering of the outer toothing of a planet gear according to an exemplary embodiment.

FIG. 7 shows, by way of example, a planet gear 4 with a double helical gearing 45 that has a first toothing 45$a$ and a second toothing 45$b$. The two toothings 45$a$, 45$b$ are separated from each other by an axial gap 45$c$. The recess 401 formed in the planet gear 4 is also shown.

FIGS. 8-15 show different embodiments of a recess that is formed in the planet gear 4. Here, one recess is respectively formed at both face sides of the planet gear 4 in an identical manner and so as to be symmetrical with respect to the axial center of the planet gear 4. The description is provided by way of example respectively only for the recess formed at the one face side. It applies in a corresponding manner to the recess formed at the other face side.

FIGS. 8-15 respectively show a sectional rendering of the planet gear 4, wherein it can be seen that, adjacent to the inner shell surface 44, the planet gear 4 forms an axial opening 49 that may for example serve for receiving a planet slide bearing pin, corresponding to the description of FIGS. 2 and 3. As described with respect to FIG. 4, the face side 41 respectively has an outer face side area 411 and an inner face side area 412 between which the recess is formed.

Here, the parameters α, β, A, B, C and E described with respect to FIG. 6 are chosen to be different in FIGS. 6-12, as will be described in the following.

Figure 8:
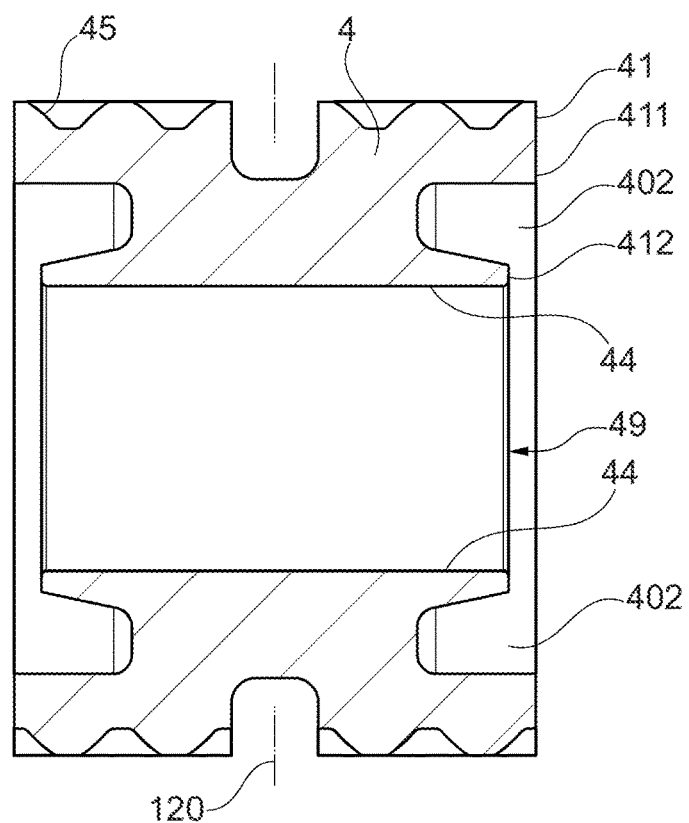
FIG. 8 shows a sectional rendering of a further exemplary embodiment of a planet gear that forms respectively one recess at its face sides that extends inside the planet gear starting from the face side, wherein the recess tapers off towards its end.

According to FIG. 8, the parameters are chosen as follows:
α=12°
β=0°
A=0.4*D
B=0.15*E
C=0.5*E The recess 402 tapers off in the direction of the axial center 120 of the planet gear 4, wherein only the radially inner boundary of the recess 402 extends obliquely to the axial direction corresponding to angle α.

Figure 9:
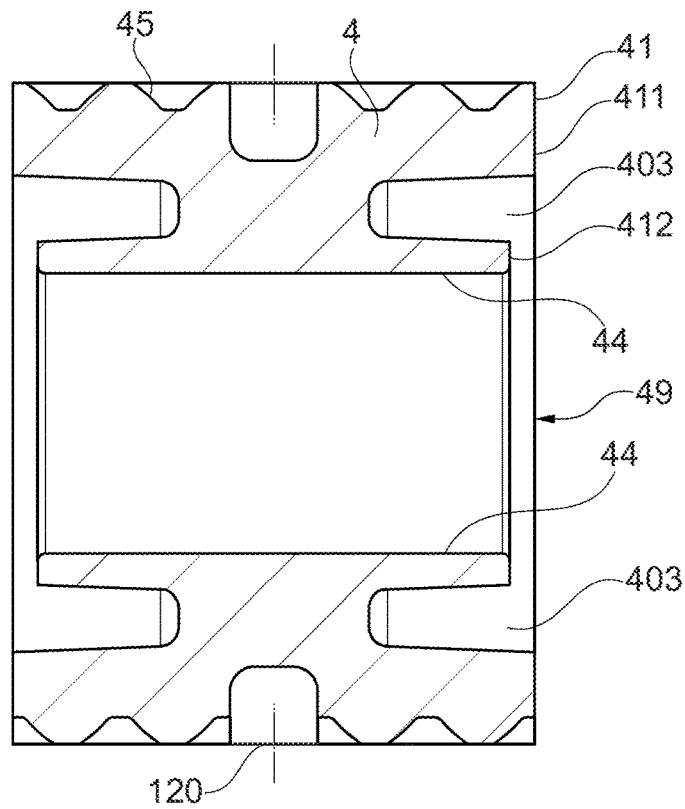
FIG. 9 shows a sectional rendering of a further exemplary embodiment of a planet gear that forms respectively one recess at its face sides that extends inside the planet gear starting from the face side, wherein the recess is formed to be substantially rectangular in the longitudinal section.

According to FIG. 9, the parameters are chosen as follows:
α=2°
β=2°
A=0.6*D
B=0.2*E
C=0.4*E Due to the small values for the angles α and β, the recess 403 extends approximately cylindrically, or in a rectangular manner in the longitudinal section. Here, due to the high value of the quotient N/D, it extends relatively far in the direction of the axial center 120 of the planet gear 4.

According to FIG. 10, the parameters are chosen as follows:
α=35°
β=35°
A=0.2*D
B=0.01*E
C=0.8*E Due to the small value of the quotient A/D, the recess 404 only extends over a relatively short axial length in the direction of the axial center 120 of the planet gear. At the same time, the radially outer boundary and the radially inner boundary of the recess 404 extend very obliquely to the axial direction due to the high values of the angles α and β.

Figure 10:
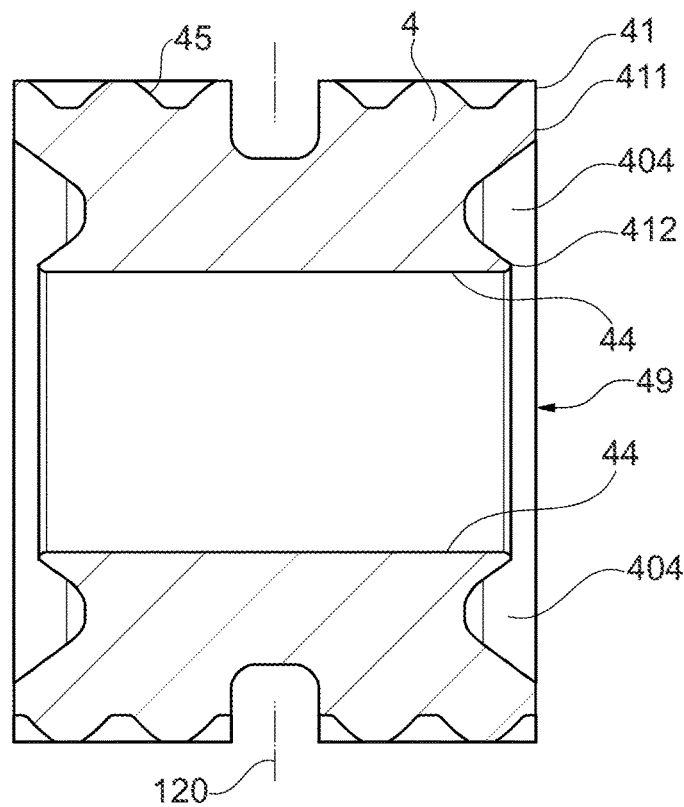
FIG. 10 shows a sectional rendering of a further exemplary embodiment of a planet gear that forms respectively one recess at its face sides that extends inside the planet gear starting from the face side, wherein the recess extends up to the inner shell surface of the planet gear with a small depth.

Further, FIG. 10 stands out in that, due to the extremely low value of the quotient B/E of 0.01, the inner face side area 412 is formed only one edge. In other words, the edges 412a, 412b of FIG. 4 coincide.

Figure 11:
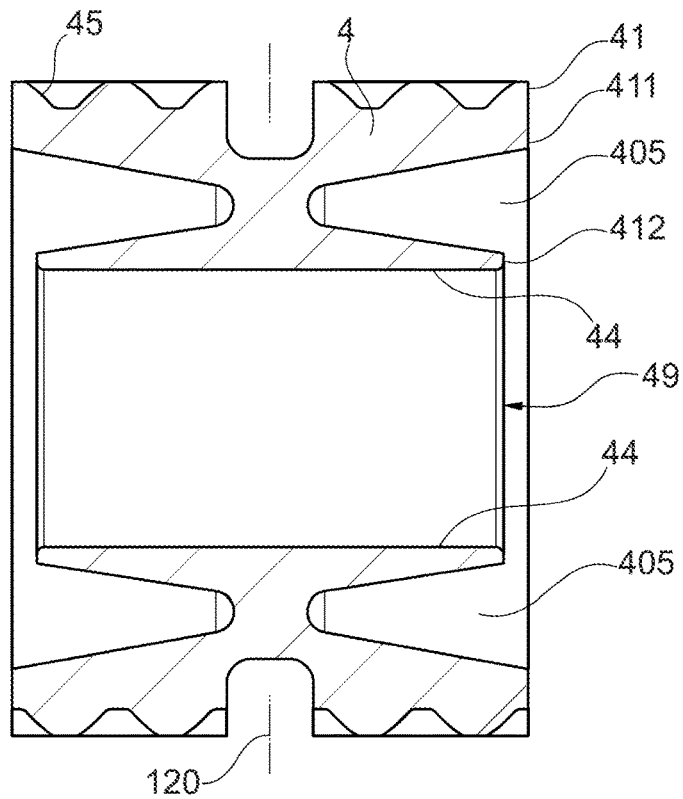
FIG. 11 shows a sectional rendering of a further exemplary embodiment of a planet gear that forms respectively one recess at its face sides that extends inside the planet gear starting from the face side, wherein the recess tapers off towards its end and has a great axial depth.

According to FIG. 11, the parameters are chosen as follows:
α=8°
β=10°
A=0.85*D
B=0.1*E
C=0.65*E Due to the very high value of the quotient A/D of 0.85, the recess 405 extends almost up to the axial center 120 of the planet gear 4. Here, the radially outer boundary and the radially inner boundary of the recess 404 extend in a slightly oblique manner with respect to the axial direction.

Figure 12:
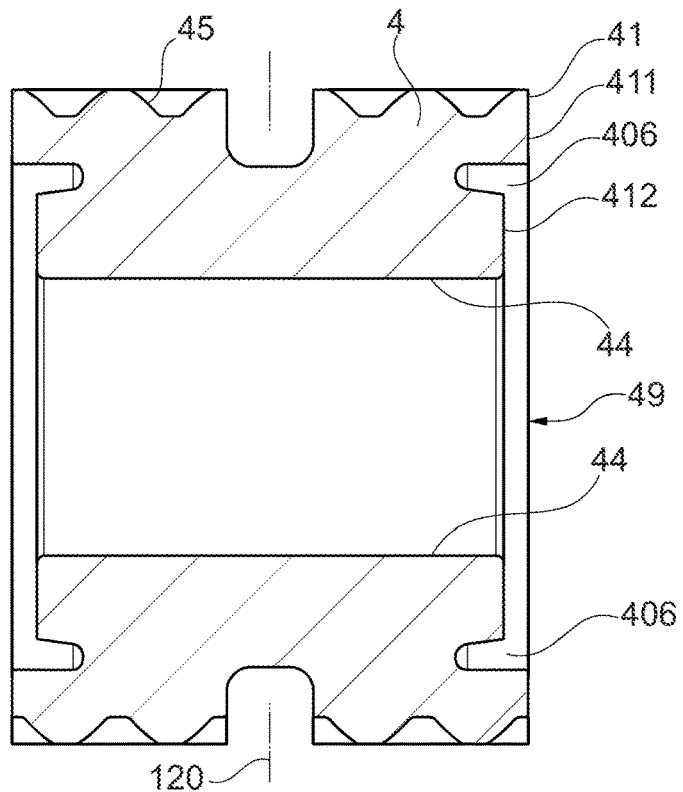
FIG. 12 shows a sectional rendering of a further exemplary embodiment of a planet gear that forms respectively one recess at its face sides that extends inside the planet gear starting from the face side, wherein the recess has a small radial thickness and axial depth.

According to FIG. 12, the parameters are chosen as follows:
α=8°
β=0°
A=0.2*D
B=0.5*E
C=0.2*E Due to the small value of the quotient A/D of 0.2, the recess 406 extends only over a relatively short axial length in the direction of the axial center 120 of the planet gear. Here, as a result of the high value of the quotient B/E, the recess 406 is located at a relatively great radial distance to the inner shell surface 44. Likewise, the radial height of the recess 406 is only small.

Figure 13:
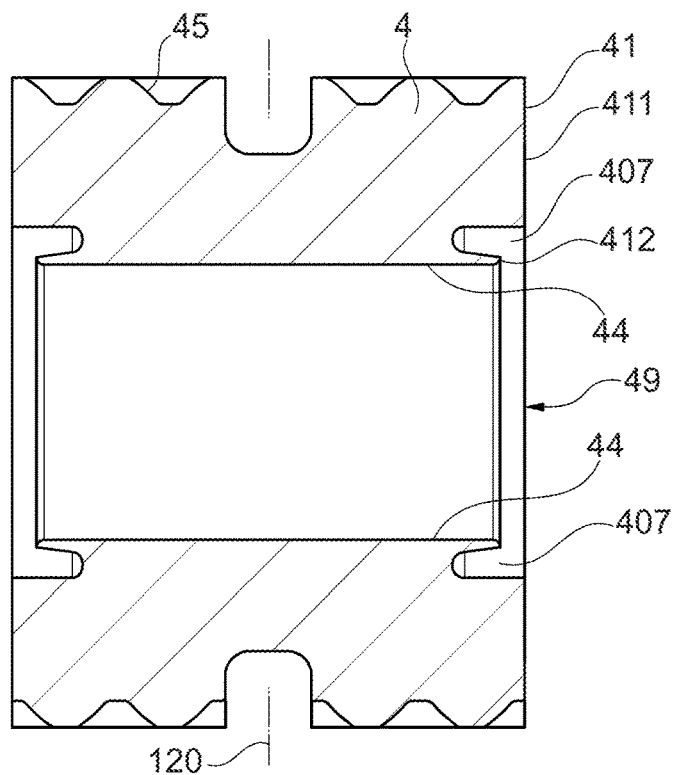
FIG. 13 shows a sectional rendering of a further exemplary embodiment of a planet gear that forms respectively one recess at its face sides that extends inside the planet gear starting from the face side, wherein the recess has a small radial thickness and axial depth, extending up to the inner shell surface of the planet gear.

According to FIG. 13, the parameters are chosen as follows:
α=8°
β=5°
A=0.2*D
B=0.05*E
C=0.2*E As in FIG. 10, it applies that, due to the small value of the quotient A/D of 0.2, the recess 107 extends only over a relatively small axial length in the direction of the axial center 120 of the planet gear. In contrast to FIG. 10, here the recess 407 is located at a small radial distance to the inner shell surface 44 as a result of the low value of the quotient B/E, wherein, similar to FIG. 8, the inner face side area 412 is substantially formed by one edge, while the outer face side area 412 has a comparatively great radial extension.

Figure 14:
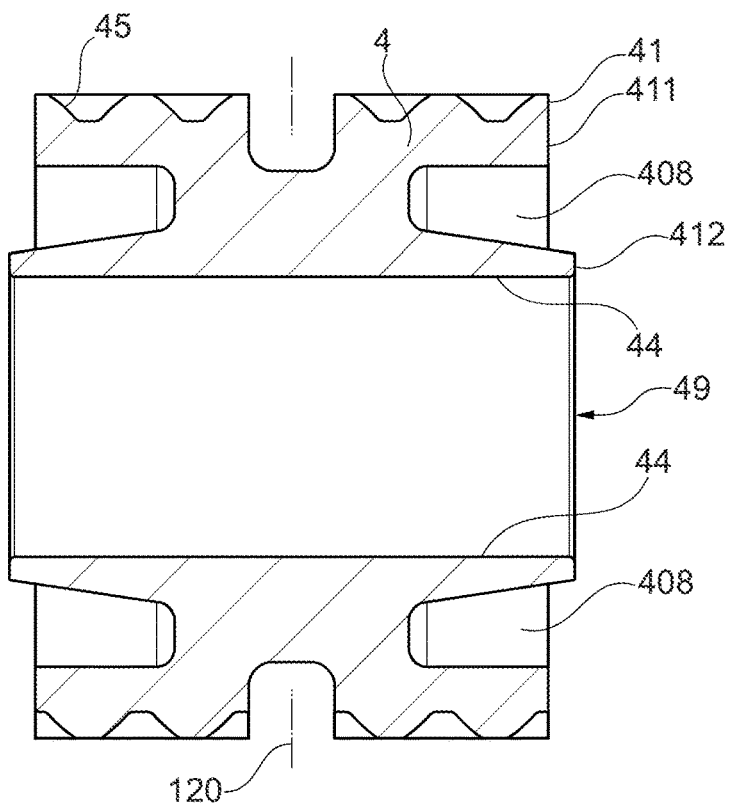
FIG. 14 shows a sectional rendering of a further exemplary embodiment of a planet gear that forms respectively one recess at its face sides that extends inside the planet gear starting from the face side, wherein the inner shell surface has a greater axial length than the outer shell surface.

According to FIG. 14, the parameters are chosen as follows:
α=8°
β=0°
A=0.7*D
B=0.15*E
C=0.5*E In FIG. 14, the axial length of the inner shell surface 44 is greater that the axial length of the outer shell surface. The profile of the recess 408 approximately corresponds to the profile of the recess 402 of FIG. 6.

Figure 15:
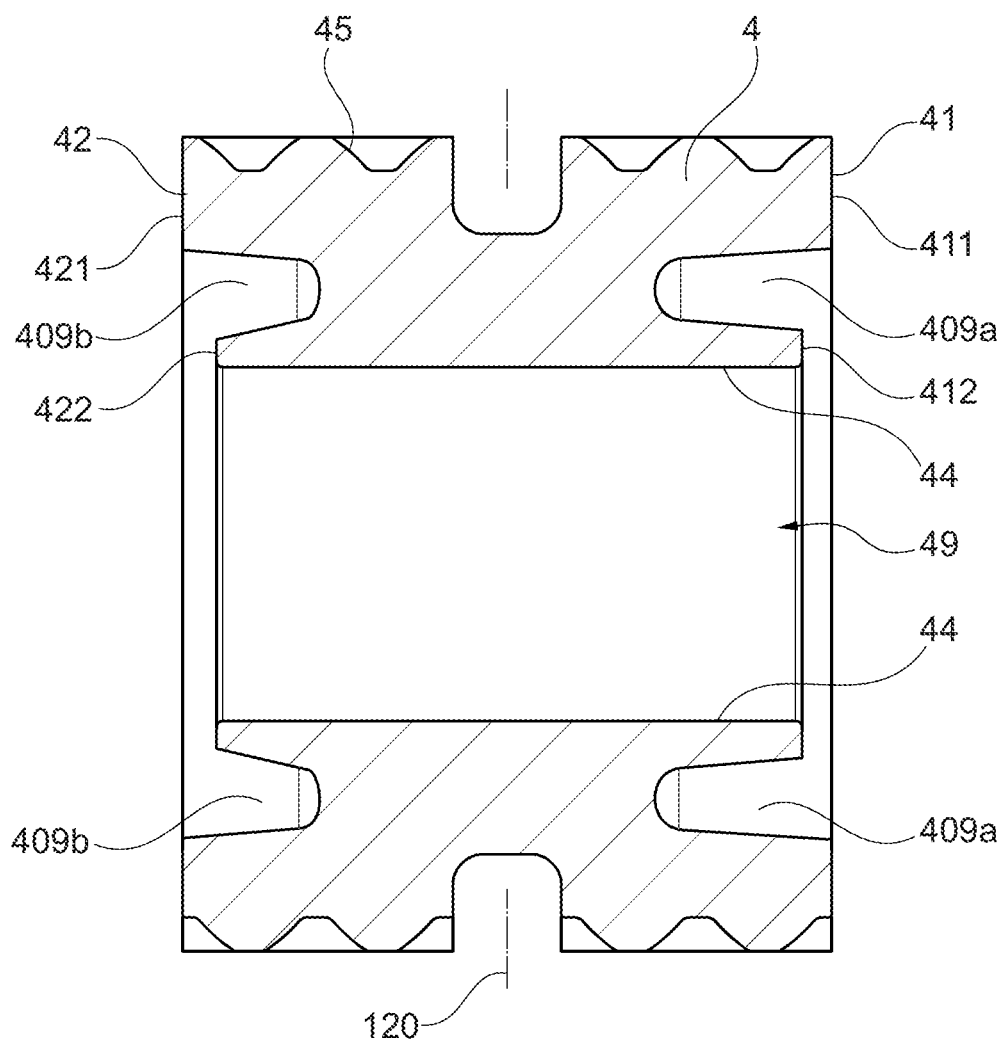
FIG. 15 shows a sectional rendering of a further exemplary embodiment of a planet gear that forms respectively one recess at its face sides that extends inside the planet gear starting from the face side, wherein the two recesses are formed to be asymmetrical with respect to the axial center of the planet gear.

According to FIG. 15, the parameters are chosen as follows:
α=13° in the left recess 409b; α=4° in the right recess 409a
β=5° in the left recess 409b; β=4° in the right recess 409a
A=0.4*D in the left recess 409b; A=0.6*D in the right recess 409a
B=0.15*E in the left recess 409b; B=0.2*E in the right recess 409a
C=0.45*E in the left recess 409b; C=0.4*E in the right recess 409a Thus, in FIG. 15 the two recesses 409a, 409b are formed in an asymmetrical manner with respect to the axial center 120 of the planet gear. Since the quotient A/D in the left recess 409b is smaller than in the right recess 409a, the left recess 409b extends over a smaller axial length in the direction of the axial center 120 of the planet gear than the right recess 409a. In other embodiments, asymmetry is present only with respect to some of the mentioned parameters.

Figure 16:
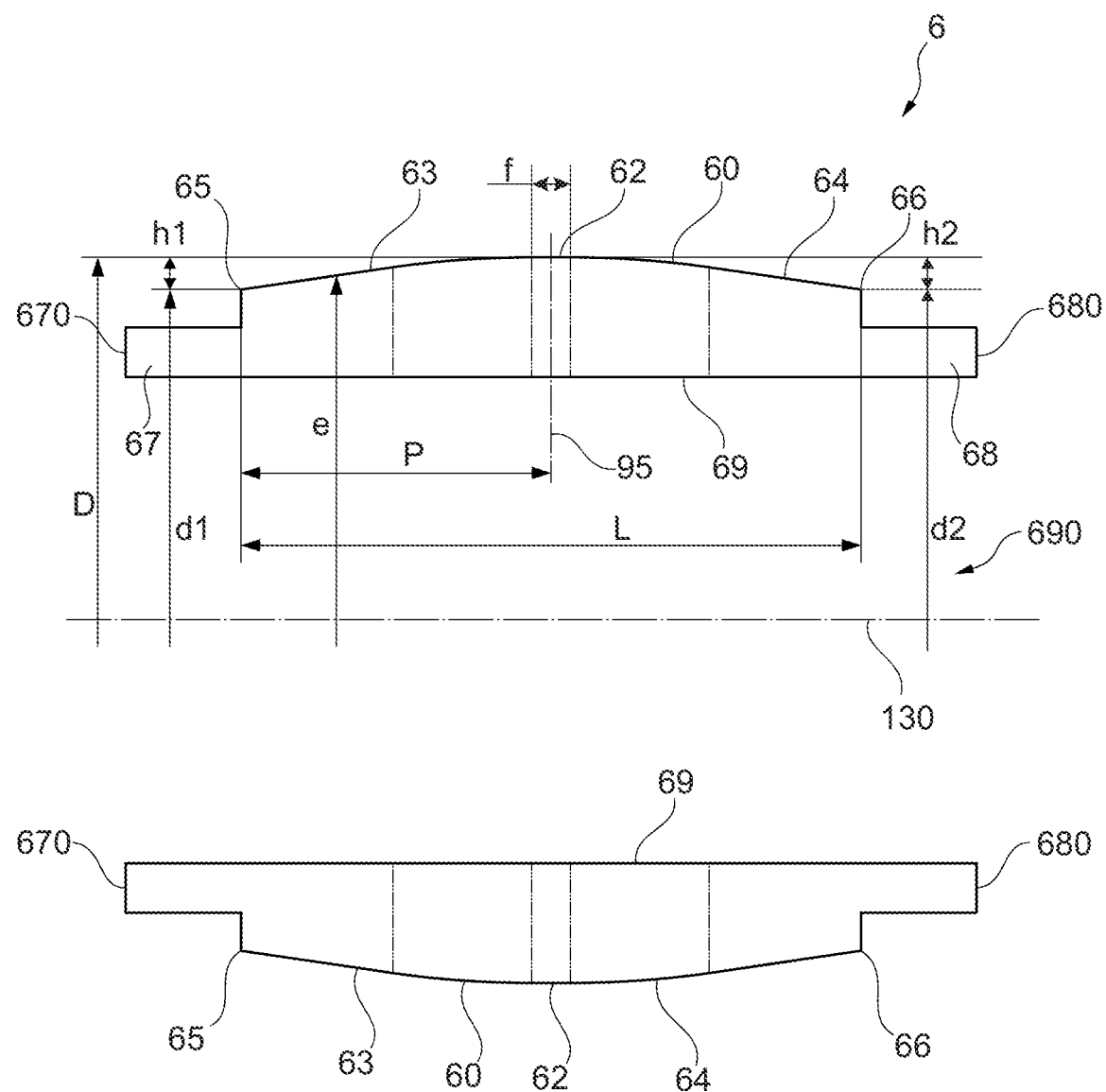
FIG. 16 shows a sectional rendering of a planet slide bearing pin that can be arranged inside a planet gear and forms a slide bearing with respect to it.

In FIG. 16, the embodiment and the relevant parameters of a planet slide bearing pin, which is formed corresponding to a planet slide bearing pin 6 according to FIGS. 2 to 5, are explained by way of example. Here, a longitudinal axis 130 of the planet slide bearing pin 6 can be seen in the sectional rendering of FIG. 16. It is substantially identical with the rotation axis 110 of the planet gear 110, cf. FIG. 2. However, the hydrodynamic design of the slide bearing entails a minor eccentricity, e.g. in the range of tenths of a millimeter. Adjacent to an inner shell surface or inner surface 69 of the planet slide bearing pin 6, the planet slide bearing pin 6 forms an axial opening 690 that serves for receiving a support slide bearing pin of a torque carrier, for example the support slide bearing pin 7 of FIG. 2.

The planet slide bearing pin 6 forms an outer-side abutment surface 60 comprising an axially forward end 65 and an axially rearward end 66. The axial distance between these two ends is indicated by L. Between these two ends 65, 66, the abutment surface 60 forms a crowning in the sense that its outer diameter decreases towards the axial ends 65, 66 and reaches a minimum at the axial ends 65, 66.

Here, the planet slide bearing pin 6 has a minimum outer diameter d1 at its axial end 65, a minimum outer diameter d2 at its axial end 66, and a maximum outer diameter D between its axial ends 65, 66. Here, half the difference h1 between the maximum outer diameter D and the minimum outer diameter d1 defines the crowning of the abutment surface between the axial position of the maximum outer diameter and the one end 65. Further, half the difference h2 between the maximum outer diameter D and the minimum outer diameter d2 defines the crowning of the abutment surface between the axial position of the maximum outer diameter and the other end 66.

It can be provided that d1 equals d2, or alternatively that d1 does not equal d2. Accordingly, h1 equals h2, or h1 does not equal h2.

The difference between the maximum outer diameter D and the outer diameter e at a regarded axial position of the planet slide bearing pin constantly increases towards the axial ends 65, 66 of the planet slide bearing pin 6.

In the exemplary embodiment of FIG. 16, the maximum outer diameter D is realized at the axial center 95 of the planet slide bearing pin 6 and in a cylindrical area 62 of the axial length f about this axial center 95. The maximum of the outer diameter D is thus realized in a cylindrical area 62 with a constant outer diameter that extends symmetrically to the axial center 95 over a defined axial length f. However, this is not necessarily the case. Alternatively, the maximum of the outer diameter D is only reached at an apex along a circumferential line or in the longitudinal section shown in FIG. 13.

The axial distance between the axially forward end 65 of the abutment surface 60 and the maximum of the outer diameter D or, if the maximum is formed in a cylindrical area, to the center of this cylindrical area, is indicated by P in FIG. 4. In FIG. 4, P is located in the axial center 95 of the abutment surface due to the symmetrical embodiment of the abutment surface 60.

In the longitudinal section, the abutment surface 60 of the planet slide bearing pin 6 forms a first convex curve 63 that extends between the cylindrical area 62 and the forward axial end 65, and forms a second convex curve 64 that extends between the cylindrical area 62 and the rearward axial end 66. In general, the curves 63, 64 can have any desired shape. For example, the curves can be formed in a circular, parabolic or rectilinear manner.

The planet slide bearing pin 6 has axial elongations or ends 67, 68, which respectively form one forward axial face side 670 of the planet slide bearing pin 6 and one rearward axial face side 680 of the planet slide bearing pin. As has been explained with respect to FIGS. 2 and 3, the planet slide bearing pin 6 is affixed at these ends 67, 68 respectively at a support plate.

In embodiments of the invention, the planet slide bearing pin 6 realizes certain ratios of the parameters h, P, f, L and D, as they are defined above.

Thus, the following applies to the ratio of the length P to the axial total length L: $0 \leq P/L \leq 1$. This means that the maximum of the outer diameter D can in general be formed at any axial position of the planet slide bearing pin 6. In particular, also asymmetrical arrangements are possible. The invention also comprises embodiment variants in which the maximum of the outer diameter D is formed at the one axial end of the abutment surface (P=0) or at the other axial end of the abutment surface (P=L). In other embodiment vari-ants, the maximum of the outer diameter D is always located between the two axial ends of the abutment surface.

The following applies to the ratio of the axial length of the cylindrical area f to the axial total length L: $0 \leq f/L \leq 0.75$. The larger this ratio, the greater the axial extension of the cylindrical area. If the ratio f/L equals zero, f equals zero, i.e. a cylindrical area with a constant outer diameter is not provided.

The following applies to the ratio of half the difference h1, h2 between the maximum outer diameter D and the minimum outer diameter d1, d2 to the maximum outer diameter D: $0.00005 \leq h1/D \leq 0.005$ as well as $0.00005 \leq h2/D \leq 0.005$. These ratios determine the crowning of the abutment surface 60. Here, h1 may equal h2.

The planet slide bearing pin 6 shown in FIG. 16 is formed in a rotationally symmetrical manner.

Figure 17:
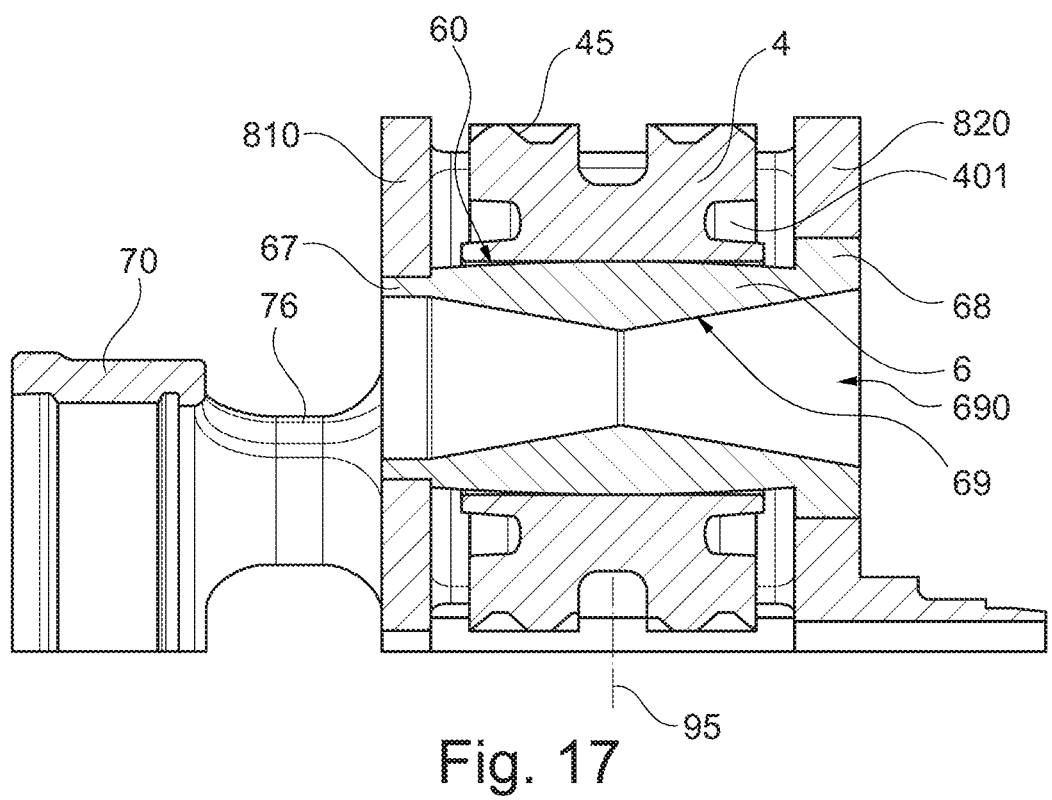
FIG. 17 shows a partially sectioned rendering of a planet slide bearing pin that is arranged in a planetary gearing according to FIGS. 4 and 5.

FIG. 17 shows an exemplary embodiment of a planet slide bearing pin 6 that forms a slide bearing with a planet gear 4 with an outer toothing 45. The planet slide bearing pin 6 is fixedly connected to a structure which, correspondingly to the exemplary embodiment of FIGS. 4 and 5, consist of a forward support plate 810, a rearward support plate 820, and a torque carrier 70. For this purpose, the planet slide bearing pin 6 comprises a first axial elongation 67 that is attached inside the forward support plate 810 and a second axial elongation 68 that is attached inside the rearward support plate 820.

The torque carrier 70 is fixedly connected to the forward support plate 810 by means of connecting webs 76. With regards to this, the description of FIGS. 4 and 5 is referred to.

The planet slide bearing pin 6 has an abutment surface 60 that is formed in a crowned manner. The planet slide bearing pin 6 further has an inner surface 69 that delimits an axial bore 690.

Figure 18:
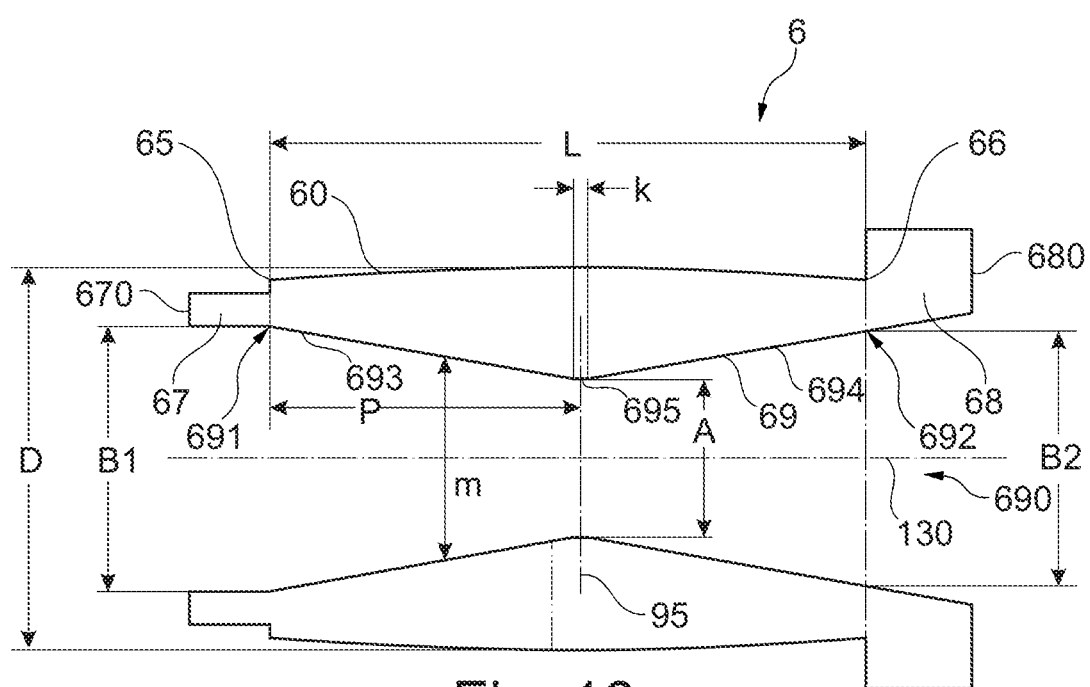
FIG. 18 shows the planet slide bearing pin of FIG. 17 in an enlarged sectioned rendering.

FIG. 18 shows the planet slide bearing pin 6 of FIG. 17 in an enlarged rendering, wherein the parameters relevant for the embodiment of the planet slide bearing pin 6 are shown. Here, a longitudinal axis 130 of the planet slide bearing pin 6 can be seen in the sectional rendering of FIG. 18. It is substantially identical to the rotation axis 110 of the planet gear 110. cf. FIG. 2, wherein, however, the hydrodynamic design of the slide bearing does entail a minor eccentricity, e.g. in the range of tenths of a millimeter.

As in FIG. 16, the planet slide bearing pin 6 forms an outer-side abutment surface 60 that has an axially forward end 65 and an axially rearward end 66. Between these two ends 65, 66, the abutment surface 60 forms a crowning in the sense that its outer diameter decreases towards the axial ends 65, 66 and reaches a minimum at the axial ends 65, 66. The abutment surface 60 has a maximum outer diameter D.

On the inside, the planet slide bearing pin 6 forms the inner surface 69 that delimits the axial bore or opening 690 radially outside and represents an inner shell surface of the planet slide bearing pin 6. Here, the axial bore 690 has a first maximum inner diameter B1 at the axial end 691 of the inner surface 69 and a second maximum inner diameter B2 at the axial end 692 of the inner surface 69. The axial distance between these two axial ends is indicated by L (and is equal to the distance between the axial ends 65, 66 of the outer abutment surface 60). Between the two axial ends 691, 692 the axial bore 690 has a minimum inner diameter A. Here, it can be provided that B1 equals B2, or alternatively that B1 does not equal B2 t: B1=B2 or B1≠B2.

The difference between the minimum inner diameter A and the inner diameter m at a regarded axial position of the planet slide bearing pin constantly increases towards the axial ends 691, 692.

In the exemplary embodiment of FIG. 18, the minimum inner diameter A is realized at the axial center 95 of the planet slide bearing pin 6 and in a cylindrical area 695 of the axial length k about this axial center 95. The minimum of the inner diameter A is thus realized in a cylindrical area 695 with a constant inner diameter that extends symmetrically to the axial center 95 across a defined axial length k. However, this is not necessarily the case. Alternatively, the minimum of the inner diameter A is only reached along a circumferential line, or at one point in the longitudinal section shown in FIG. 18.

The axial distance between the axially forward end 691 of the inner surface 69 and the minimum of the inner diameter A, or, if the minimum is formed in a cylindrical area, the center of this cylindrical area, is indicated by P in FIG. 18. If, as shown in FIG. 18, the minimum of the inner diameter A is located in the axial center 95, P also indicates the distance between the axial ends 691, 692 of the inner surface 69 and the axial center 95 as well as the distance between the axial ends 65, 66 of the outer surface and the axial center 95.

In the longitudinal section, the inner surface 69 of the planet slide bearing pin 6 forms a first curve 693 that extends between the cylindrical area 695 and the forward axial end 691, as well as a second curve 694 that extends between the cylindrical area 695 and the rearward axial end 692. In general, the curves 693, 694 can have any desired shape. The rectilinear embodiment shown herein is to be understood merely as an example. Alternatively, the curves can for example be circular or parabolic.

In the shown rectilinear embodiment of the curves 693, 694 what results is a double conical embodiment of the bore 690 in the sense that the bore 690 tapers off in a conical manner from the axial ends (at the axial positions 691, 692) towards the axial center 95 of the planet slide bearing pin 6. In this way, an embodiment of the axial bore 690 is provided which is symmetrical to the axial center 95 and at the same time rotationally symmetrical, which results in the planet slide bearing pin 6 having a greater wall thickness in its central area than at the axial ends of the inner surface 69.

The planet slide bearing pin 6 has axial elongations or ends 67, 68 that respectively form a forward axial face side 670 of the planet slide bearing pin 6 and a rearward axial face side 680 of the planet slide bearing pin. As explained with respect to FIGS. 2 to 5, at these ends 67, 68 the planet slide bearing pin 6 is respectively attached at a support plate.

It is to be understood that the outer surface 60 and the inner surface 69 have the same axial length L, wherein the points 65 and 691 as well as the points 66 and 692 have the same axial position. The outer surface 60 and the inner surface 69 extend in the axial area which serves for providing slide bearings with a planet gear. The elongations 67, 68 axially connecting thereto serve only for attaching the planet slide bearing pin 6 inside the support plates, and do not play any role with respect to the shapes and dimensions regarded herein.

In embodiments of the invention, the planet slide bearing pin 6 realizes certain ratios of the parameters A, B1, B2, k, P and L, as they have been defined above.

Thus, the following applies to the ratio of the length P to the axial total length L: $0 \leq P/L \leq 1$. This means that the minimum of the inner diameter A can in general be formed at any desired axial position of the planet slide bearing pin 6. In particular, also asymmetrical arrangements are possible. The invention also comprises embodiment variants in which the minimum of the inner diameter A is formed at the one axial end 691 of the abutment surface (P=0) or at the other axial end 692 of the abutment surface (P=L). In other embodiment variants, the minimum of the inner diameter A is always located between the two axial ends 691, 692 of the abutment surface.

The following applies to the ratio of the axial length of the cylindrical area k to the axial total length L: $0 \leq k/L \leq 0.75$. The larger this ratio, the greater the axial extension of the cylindrical area 695. If the ratio k/L equals zero, f equals zero, i.e. then a cylindrical area with a constant outer diameter is no longer present.

The following applies to the ratio between the minimum inner diameter A and the maximum inner diameters B1, B2: $0 \leq A/B1 \leq 0.99$ and $0 \leq A/B2 \leq 0.99$. The closer this ratio is to 1, the smaller the taper of the axial bore 690.

The planet slide bearing pin 6 shown in FIG. 18 is formed in a rotationally symmetrical manner.

Figure 23:
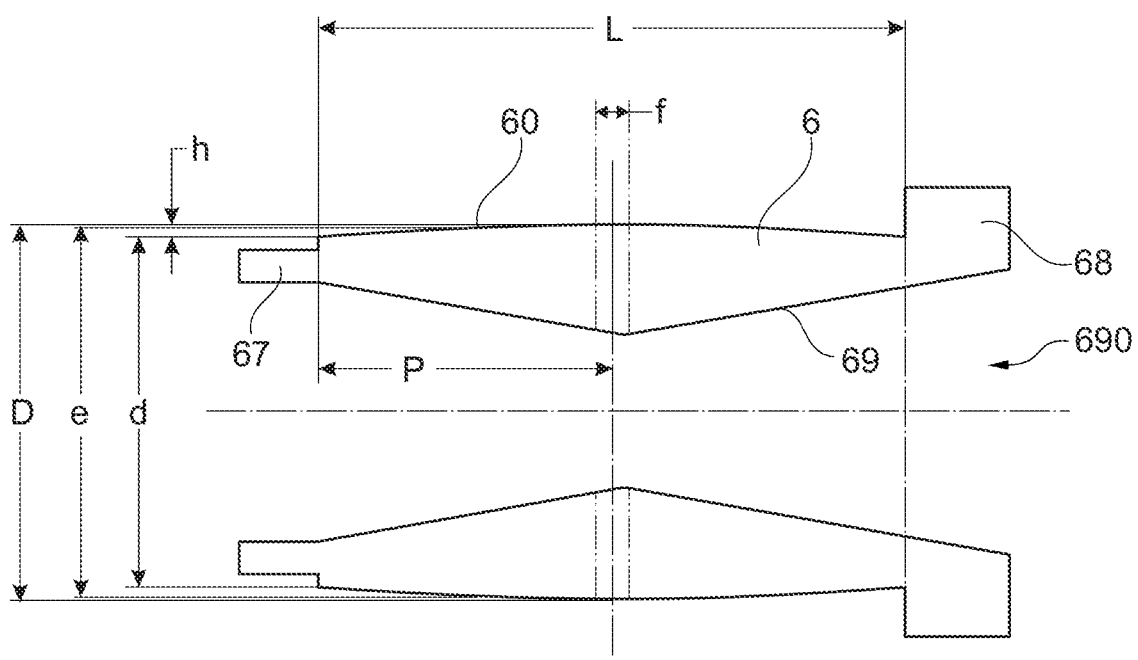
FIG. 23 shows another rendering of the planet slide bearing pin of FIG. 17 in an enlarged sectioned rendering.

FIG. 23 is another enlarged rendering of the planet slide bearing pin 6 of FIG. 17, wherein, in a manner corresponding to the rendering of FIG. 16, the parameters D, d, e, f, h, P and L relevant for the configuration of the planet slide bearing pin 6 indicated therein are also shown. As for the definition of these parameters, the description of FIG. 16 is referred to. In contrast to FIG. 16, it is assumed that only the minimum outer diameter of the planet slide bearing pin 6 is identical at the two axial ends, so that this parameter is indicated by d (without the differentiation between d1 and d2, and correspondingly also without the differentiation between h1 and h2 being made in FIG. 6).

FIGS. 19-22 respectively show, in a sectional view, different embodiments of a planet slide bearing pin 6 corresponding to the planet slide bearing pin of FIG. 16, wherein it can be seen that, adjacent to the interior surface 69, the planet slide bearing pin 6 forms an opening 690 that may for example serve for receiving a planet slide bearing pin in a manner corresponding to the description of FIGS. 2 and 3.

Here, the parameters f, h, P and L that have been explained with reference to FIG. 16 are chosen differently in FIGS. 19-22, as will be described in the following.

Figure 19:
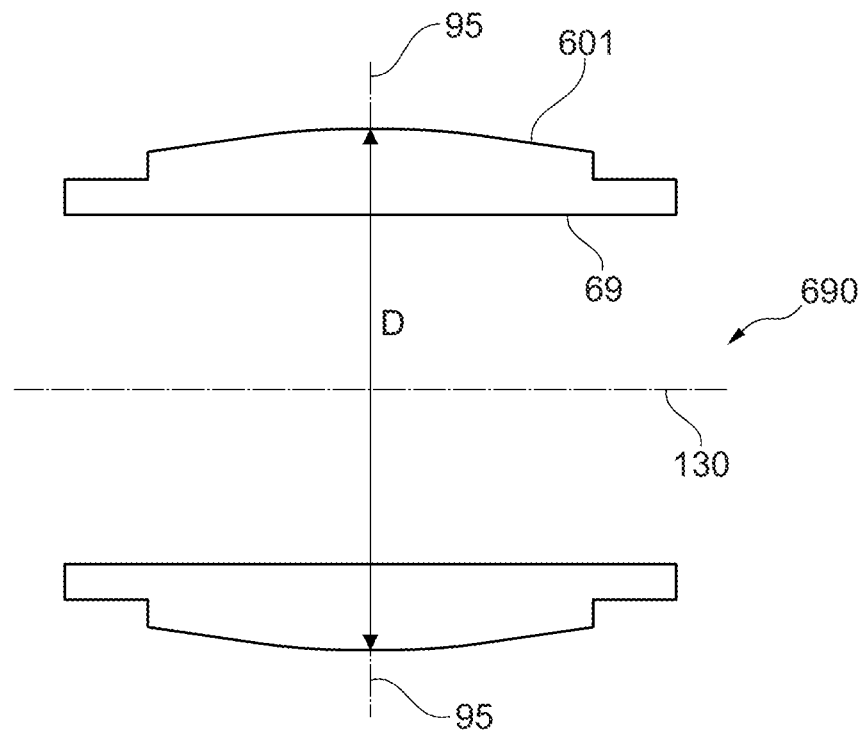
FIG. 19 shows a sectional view of a further exemplary embodiment of a planet slide bearing pin where the planet slide bearing pin is formed to be mirror-symmetrical with respect to its axial center and the abutment surface is formed without a cylindrical area.

In the exemplary embodiment of FIG. 19, the abutment surface 601 is formed without a cylindrical area, i.e. the parameter f equals zero. Correspondingly, the maximum outer diameter D is realized in the axial center 95 of the planet slide bearing pin 6. The two convex curves 63, 64 of FIG. 16 form a common curve, which may for example be formed by a circular arc.

Here, the planet slide bearing pin of FIG. 19 is formed to be mirror-symmetrical with respect to its axial center 95.

Figure 20:
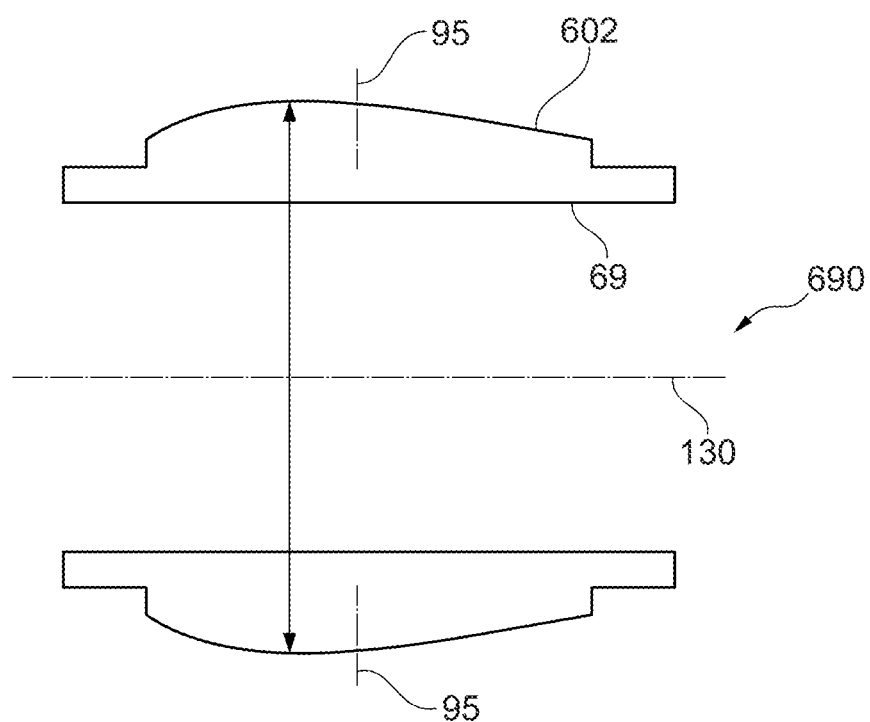
FIG. 20 shows a sectional view of a further exemplary embodiment of a planet slide bearing pin provided with a crowning, wherein the planet slide bearing pin forms an asymmetrically shaped abutment surface.

In the exemplary embodiment of FIG. 20, the maximum of the outer diameter D is realized outside of the axial center 95, so that an asymmetry is realized in the design of the abutment surface 602. Again, no cylindrical area is provided. In the regarded sectional view, the two convex curves 63, 64 of FIG. 16 form a common curve 602. If may for example be formed by a parabolic arc.

Figure 21:
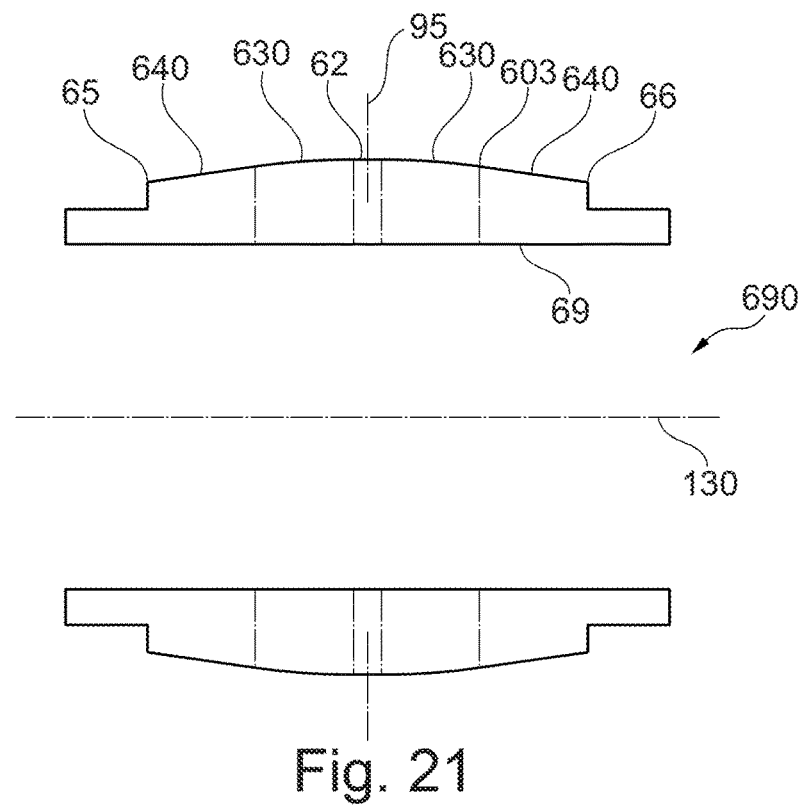
FIG. 21 shows a sectional view of a further exemplary embodiment of a planet slide bearing pin provided with a crowning, wherein the planet slide bearing pin is formed symmetrically and the abutment surface has differently formed areas.

In FIG. 21, an exemplary embodiment is regarded in which the abutment surface 603 forms a cylindrical area 62 in which the outer diameter D is maximal. This area 62 is formed in the center, so that the planet slide bearing pin 6 is mirror-symmetrical with respect to its axial center 95.

Adjacent to the cylindrical area 62 on both sides, the abutment surface 603 forms areas that are curved in a circular manner, with conically shaped areas that extend up to the axial ends 65, 66 of the abutment surface 603 connecting to these areas. In the sectional view of FIG. 21 the abutment surface forms a circular arc 630 in the circularly curved area and a straight line 640 in the conically shaped area, with the latter extending up to the axial ends 65, 66 of the abutment surface 603.

Figure 22:
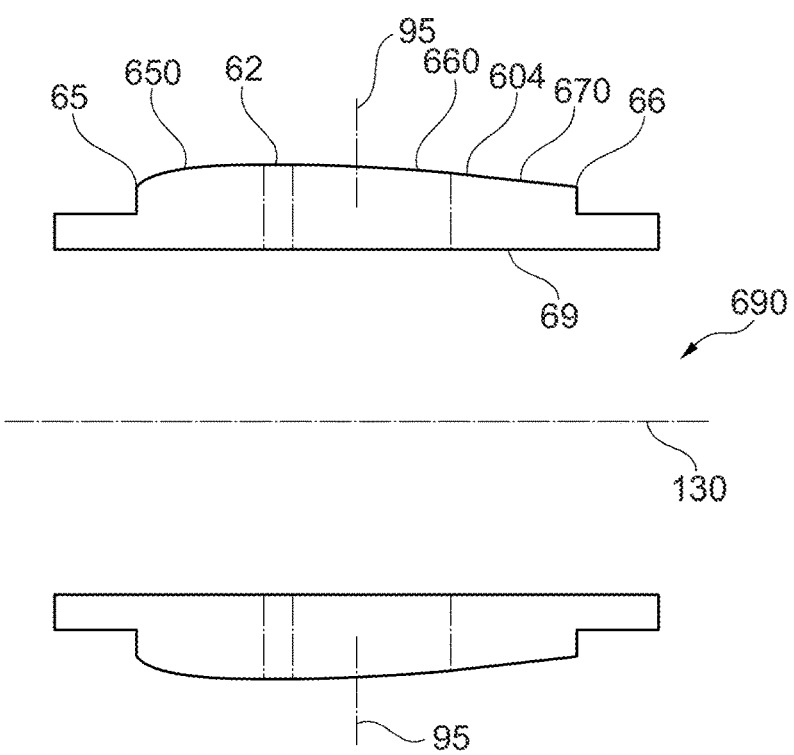
FIG. 22 shows a sectional view of a further exemplary embodiment of a planet slide bearing pin provided with a crowning, wherein the planet slide bearing pin is formed asymmetrically and the abutment surface has differently formed areas.

FIG. 22 shows an exemplary embodiment in which the maximum of the outer diameter D is realized outside of the axial center 95, so that an asymmetry is realized in the design of the abutment surface 604. Here, the abutment surface 604 forms a cylindrical area 62 in which the outer diameter D is maximal. However, this area 62 is formed in a manner offset to the axial center 95 of the planet slide bearing pin 6. From the cylindrical area 62, a parabolically curved area extends up to the axial forward end 65 of the abutment surface 604, which forms a parabolic line 650 in FIG. 22. Two differently configured areas are formed between the cylindrical area 62 and the axially rearward end 66 of the abutment surface 604, at first a circularly curved area and, connecting thereto and extending up to the axial end 66, a conically tapering area, which form a circular arc 660 and a straight line 670 in the sectional view of FIG. 22.

Figure 24:
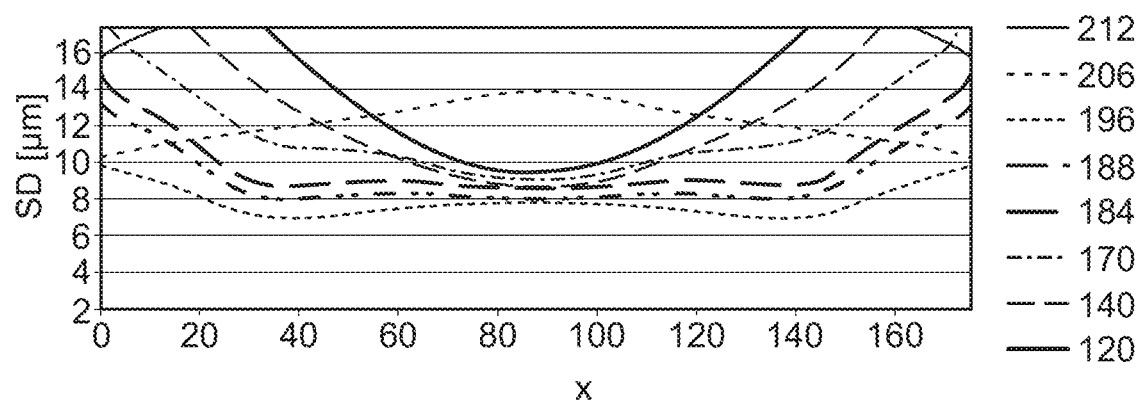
FIG. 24 shows the lubricating film thickness of a slide bearing depending on the axial position of the slide bearing for a planet slide bearing pin with an abutment surface embodied with a crowned design.
Figure 25:
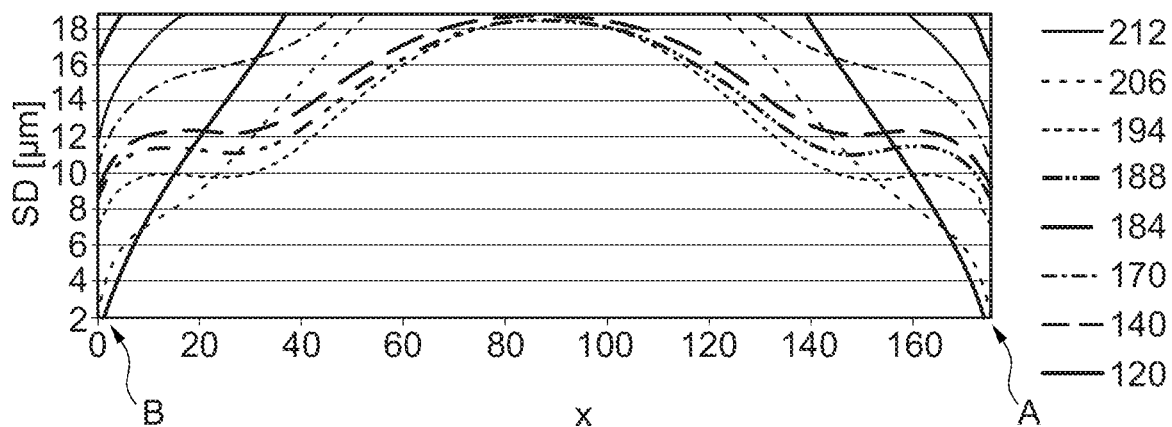
FIG. 25 shows the lubricating film thickness of a slide bearing depending on the axial position of the slide bearing for a cylindrically formed planet slide bearing pin.

The advantages associated with the crowning of the planet slide bearing pin are illustrated in FIGS. 24 and 25, which respectively show the lubricating film thickness SD of the slide bearing depending on the axial position x of the slide bearing. Here, FIG. 25 shows the conditions at a planet slide bearing pin, which has a purely cylindrically shaped surface that is not provided with a crowning, at 80% loading. It can be seen that the lubricating film thickness SD strongly decreases towards the axial ends (cf. arrows A, B), which leads to an increased lubrication film thickness and the danger of a metal-on-metal contact between the planet slide bearing pin and the planet gear.

FIG. 24 shows the lubricating film thickness SD of the slide bearing depending on the axial position x of the slide bearing for a planet slide bearing pin, which has a surface provided with a crowning, at 100% loading. A sufficient lubricating film thickness is ensured also at the axial ends.

The present invention is not limited in its design to the above-described exemplary embodiments. In particular, the described shapes of the planet gear 4 and of the planet slide bearing pin 6 are to be understood merely as examples.

Further, it is to be understood that the features of the individual described exemplary embodiments of the invention can be combined with each other in different combinations. As far as ranges are defined, they comprise all values within this range, as well as all partial ranges that fall within a range.

The invention claimed is:

1. A planetary gearing, comprising:
a sun gear rotatable about a rotation axis of the planetary gearing and driven by a sun shaft, wherein the rotation axis defines an axial direction of the planetary gearing,
a plurality of planet gears that are driven by the sun gear, wherein each planet gear has an axially forward face side and an axially rearward face side and includes an outer shell surface that includes a toothing that is a double helical gearing,
a ring gear with which the plurality of planet gears is in engagement,
a plurality of planet slide bearing pins, respectively having an outer-side abutment surface that comprises an axially forward end and an axially rearward end,
wherein respectively one planet slide bearing pin is arranged inside a planet gear, and the planet slide bearing pin and the planet gear form a lubricated journal bearing,
wherein, each planet gear includes a forward recess that extends inside the planet gear starting from the axially forward face side and a rearward recess that extends inside the planet gear starting from the axially rearward face side, and
wherein the abutment surface is crowned with an outer diameter decreasing from a maximum outer diameter towards at least one chosen from the axially forward end and the axially rearward end and having at least one minimum outer diameter at the at least one chosen from the axially forward end and the axially rearward end,
wherein the forward recess and the rearward recess are asymmetrical with respect to one another with respect to an axial center of the planet gear.

2. The planetary gearing according to claim 1, wherein a radial thickness of at least one chosen from the forward recess and the rearward recess decreases with growing distance from a respective one of the axially forward face side and the axially rearward face side.

3. The planetary gearing according to claim 2, wherein each planet gear further comprises:
an inner shell surface,
at least one chosen from the axially forward face side and the axially rearward face side:
an outer face side area extending from a respective one of the forward recess and the rearward recess outwardly to the outer shell surface, wherein the outer face side area forms a radially inner face side edge to the respective one of the forward recess and the rearward recess and a radially outer face side edge to the outer shell surface,
an inner face side area extending from the respective one of the forward recess and the rearward recess inwardly to the inner shell surface, wherein the inner face side area forms a radially outer face side edge to the respective one of the forward recess and the rearward recess and a radially inner face side edge to the inner shell surface,
wherein the radial thickness of the respective one of the forward recess and the rearward recess is defined as a radial distance between the radially inner face side edge of the outer face side area and the radially outer face side edge of the inner face side area.

4. The planetary gearing according to claim 3, wherein, also adjacent to the inner face side area, a radially inner boundary of the respective one of the forward recess and the rearward recess forms an angle to the axial direction that is between 0° and 45°.

5. The planetary gearing according to claim 3, wherein, also adjacent to the outer face side area, a radially outer boundary of the respective one of the forward recess and the rearward recess forms an angle to the axial direction that is between 0° and 45°.

6. The planetary gearing according to claim 3, wherein
the outer shell surface has an axial length,
the inner shell surface has an axial length,
a thickness of the planet gear is defined by a radial distance between the inner shell surface and a tooth base plane of the toothing.

7. The planetary gearing according to claim 6, wherein a ratio of the radial thickness of the respective one of the forward recess and the rearward recess at the face side to the thickness of the planet gear is between 0.1 and 0.9.

8. The planetary gearing according to claim 6, wherein a ratio of the radial thickness of the inner face side area to the thickness of the planet gear is between 0.01 and 0.6.

9. The planetary gearing according to claim 6, wherein a ratio of an axial length of the respective one of the forward recess and the rearward recess to half the axial length of the inner shell surface is between 0.01 and 0.9, wherein the axial length of the respective one of the forward recess and the rearward recess is measured starting from the inner face side area.

10. The planetary gearing according to claim 6, wherein the axial length of the outer shell surface is not equal to the axial length of the inner shell surface.

11. The planetary gearing according to claim 1, wherein, at an end formed in the planet gear, at least one chosen from the forward recess and the rearward recess is formed by a substantially radially extending surface that transitions via rounded corners into a radially outer boundary and into a radially inner boundary of the at least one chosen from the forward recess and the rearward recess.

12. The planetary gearing according to claim 11, wherein at least one chosen from the radially outer boundary and the radially inner boundary is formed to be at least one chosen from rectilinear, circular and parabolic in a longitudinal section.

13. The planetary gearing according to claim 12, wherein the at least one chosen from the forward recess and the rearward recess extends in a circumferential direction of the planet gear by 360°.

14. The planetary gearing according to claim 1, and further comprising a torque carrier, wherein the plurality of planet slide bearing pins are coupled with the torque carrier, and the torque carrier rotates about the rotation axis of the planetary gearing, with the sun gear rotating and the ring gear being fixedly attached.

15. The planetary gearing according to claim 14, and further comprising at least one chosen from:

wherein the plurality of planet slide bearing pins have respectively, axial openings at inner sides for receiving support slide bearing pins of the torque carrier, and further comprising a forward support plate and a rearward support plate and wherein the plurality of planet slide bearing pins are fixedly connected to the forward support plate and to the rearward support plate, wherein the forward support plate is coupled with the torque carrier for torque transmission.

16. A gear fan engine, comprising:
a fan stage,
a fan shaft via which the fan stage is driven,
a turbine shaft,
wherein the turbine shaft and the fan shaft are coupled via the planetary gearing according to claim 1, wherein the turbine shaft forms the sun shaft, the planet slide bearing pins are coupled with a torque carrier and the torque carrier is coupled with the fan shaft.

* * * * *